(12) United States Patent
Schubert et al.

(10) Patent No.: US 12,449,417 B2
(45) Date of Patent: Oct. 21, 2025

(54) DEVICE FOR DIGITAL READ OF LATERAL FLOW ASSAY

(71) Applicant: ABBOTT RAPID DIAGNOSTICS INTERNATIONAL UNLIMITED COMPANY, Dublin (IE)

(72) Inventors: Axel Schubert, San Francisco, CA (US); Thomas Ullrich, Abbott Park, IL (US); Sören Geist, Abbott Park, IL (US)

(73) Assignee: Abbott Rapid Diagnostics International Unlimited Company, Dublin (IE)

( * ) Notice: Subject to any disclaimer, the term of this patent is extended or adjusted under 35 U.S.C. 154(b) by 820 days.

(21) Appl. No.: 17/775,842

(22) PCT Filed: Nov. 13, 2020

(86) PCT No.: PCT/US2020/060390
§ 371 (c)(1),
(2) Date: May 10, 2022

(87) PCT Pub. No.: WO2021/097193
PCT Pub. Date: May 20, 2021

(65) Prior Publication Data
US 2022/0381778 A1 Dec. 1, 2022

Related U.S. Application Data

(60) Provisional application No. 62/936,279, filed on Nov. 15, 2019.

(51) Int. Cl.
*B01L 3/00* (2006.01)
*G01N 21/00* (2006.01)
(Continued)

(52) U.S. Cl.
CPC ... *G01N 33/54388* (2021.08); *G01N 21/6428* (2013.01); *G01N 21/6456* (2013.01);
(Continued)

(58) Field of Classification Search
CPC .......................... H04M 1/04; G01N 33/54388
See application file for complete search history.

(56) References Cited

U.S. PATENT DOCUMENTS

| 4,956,302 A | 9/1990 | Gordon et al. |
| 5,008,080 A | 4/1991 | Brown, III et al. |

(Continued)

FOREIGN PATENT DOCUMENTS

| EP | 0987551 | 4/2000 |
| EP | 2735863 A1 * | 5/2014 |

(Continued)

OTHER PUBLICATIONS

Altschuel et al. (1977) "Gapped BLAST and PSI-BLAST: a new generation of protein database search programs", Nucleic Acids Res. 25(17): 3389-3402.
(Continued)

*Primary Examiner* — Nathan A Bowers
(74) *Attorney, Agent, or Firm* — Edward J. Baba; Mandar A. Joshi; Bozicevic, Field & Francis LLP

(57) ABSTRACT

A device for receiving a digital reader and a lateral flow assay (LFA) cartridge and systems incorporating the same are provided. Aspects of the device include a body having a frame configured to receive the digital reader and a base plate having one or more LFA cartridge receiving positions for positioning one or more LFA cartridges at a fixed orientation relative to a planar space defined by the frame. Also provided are methods for using the device to read a result indicative of the presence or absence of an analyte in a sample.

19 Claims, 14 Drawing Sheets

(51) Int. Cl.
  *G01N 21/64* (2006.01)
  *G01N 33/543* (2006.01)
  *G01N 33/569* (2006.01)

(52) U.S. Cl.
  CPC .......... *G01N 33/56983* (2013.01); *G01N 2021/6439* (2013.01); *G01N 2333/165* (2013.01)

(56) References Cited

U.S. PATENT DOCUMENTS

| | | | |
|---|---|---|---|
| 6,183,972 B1 | 2/2001 | Kuo et al. | |
| 6,764,825 B1 | 7/2004 | Wang | |
| 8,889,424 B2 | 11/2014 | Ehrenkranz et al. | |
| 8,947,656 B2 * | 2/2015 | Cunningham | G01J 3/0272 356/300 |
| 10,054,584 B2 * | 8/2018 | Ehrenkranz | G01N 33/78 |
| 10,132,802 B2 | 11/2018 | Ehrenkranz | |
| 2006/0292040 A1 * | 12/2006 | Wickstead | G01N 21/8483 422/82.05 |
| 2010/0120129 A1 | 5/2010 | Amshey et al. | |
| 2011/0256024 A1 * | 10/2011 | Cole | A61B 5/0022 422/68.1 |
| 2014/0286550 A1 * | 9/2014 | Beule | G01N 21/8483 382/128 |
| 2015/0359458 A1 | 12/2015 | Erickson et al. | |
| 2016/0327488 A1 | 11/2016 | Williams et al. | |
| 2017/0023542 A1 | 1/2017 | Wang et al. | |
| 2017/0157615 A1 * | 6/2017 | Carrano | B01L 9/527 |
| 2018/0045723 A1 * | 2/2018 | Mäkinen | B01L 3/502 |
| 2019/0154566 A1 * | 5/2019 | Ast | A61B 5/7225 |
| 2019/0234929 A1 | 8/2019 | Adelman et al. | |
| 2019/0302009 A1 | 10/2019 | Borich et al. | |
| 2020/0300697 A1 * | 9/2020 | Cunningham | G01J 3/18 |
| 2021/0302412 A1 * | 9/2021 | Joseph | G01N 33/4905 |

FOREIGN PATENT DOCUMENTS

| | | |
|---|---|---|
| WO | WO1990/06511 | 6/1990 |
| WO | WO2015/004555 | 1/2015 |
| WO | WO2018/152573 | 8/2018 |

OTHER PUBLICATIONS

Altschuel et al. (1990) "Basic Local Alignment Search Tool", J. Mol. Biol. 215: 403-410.

Chothia et al. (1985) "Domain Association in Immunoglobulin Molecules", J. Mol. Biol. 186: 651-663.

Chothia et al. (1987) "Canonical Structures for the Hypervariable Regions of Immunoglobulins", J. Mol. Biol. 196: 901-917.

Chothia et al. (1989) "Conformations of immunoglobulin hypervariable regions", Nature 342: 878-883.

Henikoff et al. (1989) "Amino acid substitution matrices from protein blocks", Proc. Natl. Acad. Sci. USA 89: 10915-10919.

Needleman et al. (1970) "A General Method Applicable to the Search for Similarities in the Amino Acid Sequence of Two Proteins", J. Mol. Biol. 48:443-453.

Pearson et al. (1988) "Improved Tools for biological sequence comparison", Proc. Natl. Acad. Sci. USA 85: 2444-2448.

Smith et al. (1981) "Comparison of Biosequences", Adv. Appl. Math. 2: 482-489.

* cited by examiner

DEVICE FOR DIGITAL READ OF LATERAL FLOW ASSAY

CROSS REFERENCE TO RELATED APPLICATION

This application claims the benefit of U.S. Provisional Patent Application Ser. No. 62/936,279, filed Nov. 15, 2019, which application is incorporated herein by reference in its entirety.

INTRODUCTION

Sampling and testing of biological samples are commonly used for assessing humans, animals, and plants for any number of biochemical or physiological conditions and for determining the general state of health of an organism. For example, sampling and testing of human body fluids is often performed for point-of-care testing ("POCT"). POCT is defined as medical testing at or near the site of patient care. The driving notion behind POCT is to bring the test conveniently and immediately to the patient. This increases the likelihood that the patient, physician, and care team will receive the results more quickly, which allows for immediate clinical management decisions to be made. POCT examples include, but are not limited to, blood glucose testing, hormone testing, cardiac pulmonary, gastroenterology, urology, dermatology, neurology, pediatrics, surgical, public health, bioterrorism, food safety, and veterinary and plant pathology testing, metabolic testing (e.g., thyroid stimulating hormone), blood gas and electrolytes analysis, rapid coagulation testing, rapid cardiac markers diagnostics, drugs of abuse screening, urine testing, pregnancy testing, fecal occult blood analysis, food pathogen screening, complete blood count ("CBC"), hemoglobin diagnostics, infectious disease testing, cholesterol screening cancer testing (e.g. PSA), hormone testing (hCG, LH, FSH), cardiac (troponin), pulmonary, gastroenterology (e.g., *H. pylori* antibodies), urology, dermatology, neurology, pediatrics, surgical, and public health (Ebola, cholera, HIV), and combinations thereof.

One testing method that is often employed for POCT and more conventional testing involves the use of lateral-flow chromatographic immunoassay cassettes. Lateral-flow chromatographic immunoassay cassettes can be used to easily and quickly obtain a variety of qualitative results relating to a number of biochemical and physiological conditions and disease states of an individual. These kinds of tests require the end user to simply add a sample to the cassette and then observe the result a few minutes later. Since such rapid and easy-to-use tests are user friendly, they are very popular in both the professional and consumer markets. Such tests are also very popular in areas where access to trained health care professionals is limited or where access to proper medical facilities is limited (e.g., poor areas, developing countries, war zones, etc.).

Lateral flow chromatographic immunoassay methods and cartridges have been described extensively. See, e.g., Gordon and Pugh, U.S. Pat. No. 4,956,302; H. Buck, et al., WO 90/06511; T. Wang, U.S. Pat. No. 6,764,825; W. Brown, et al., U.S. Pat. No. 5,008,080; Kuo and Meritt, U.S. Pat. No. 6,183,972, EP 00987551A3. Such assays involve the detection and determination of an analyte substance that is a member of a specific binding pair consisting of a ligand and a receptor. The ligand and the receptor are related in that the receptor specifically binds to the ligand, being capable of distinguishing a specific ligand or ligands from other sample constituents having similar characteristics Immunological assays involving reactions between antibodies and antigens are one such example of a specific binding assay. Other examples include DNA and RNA hybridization reactions and binding reactions involving hormones and other biological receptors. One well-known commercial embodiment of this technique is the Clearblue One-Step Pregnancy Test. The terms "cartridge" and "cassette" are used interchangeably herein.

Lateral flow chromatographic immunoassay test cassettes have a number of desirable characteristics including their ease of use and broad applicability to a variety of analytes. Likewise, immunoassay procedures capable of being carried out on a test strip and which can be administered in the field or other locations where medical testing laboratories are not readily available have provided a great benefit to the diagnosis and control of disease. Currently, however, such lateral flow chromatographic immunoassay tests are generally only capable of providing qualitative results. That is, while currently available lateral flow chromatographic immunoassay test cassettes and cassette reader apparatuses are particularly well-suited for telling a practitioner whether or not one or more test substances are present in a sample above a given detection limit, they are poorly suited for providing quantitative results. There is an ongoing need in the art for devices and methods that combine the ease of use characteristics of lateral flow chromatographic immunoassay tests with systems that are designed to provide quantitative results. Such devices and methods may, for example, allow medical practitioners to diagnose a variety of conditions at the point of care (e.g., chair-side or essentially anywhere in the world) without being tied to a medical facility or a testing laboratory.

SUMMARY

A device for receiving a digital reader and a lateral flow assay (LFA) cartridge and systems incorporating the same are provided. Aspects of the device include a body having a frame configured to receive the digital reader and a base plate having one or more LFA cartridge receiving positions for positioning one or more LFA cartridges at a fixed orientation relative to a planar space defined by the frame. Also provided are methods for using the device to read a result indicative of the presence or absence of an analyte in a sample.

DETAILED DESCRIPTION

Figure 1:
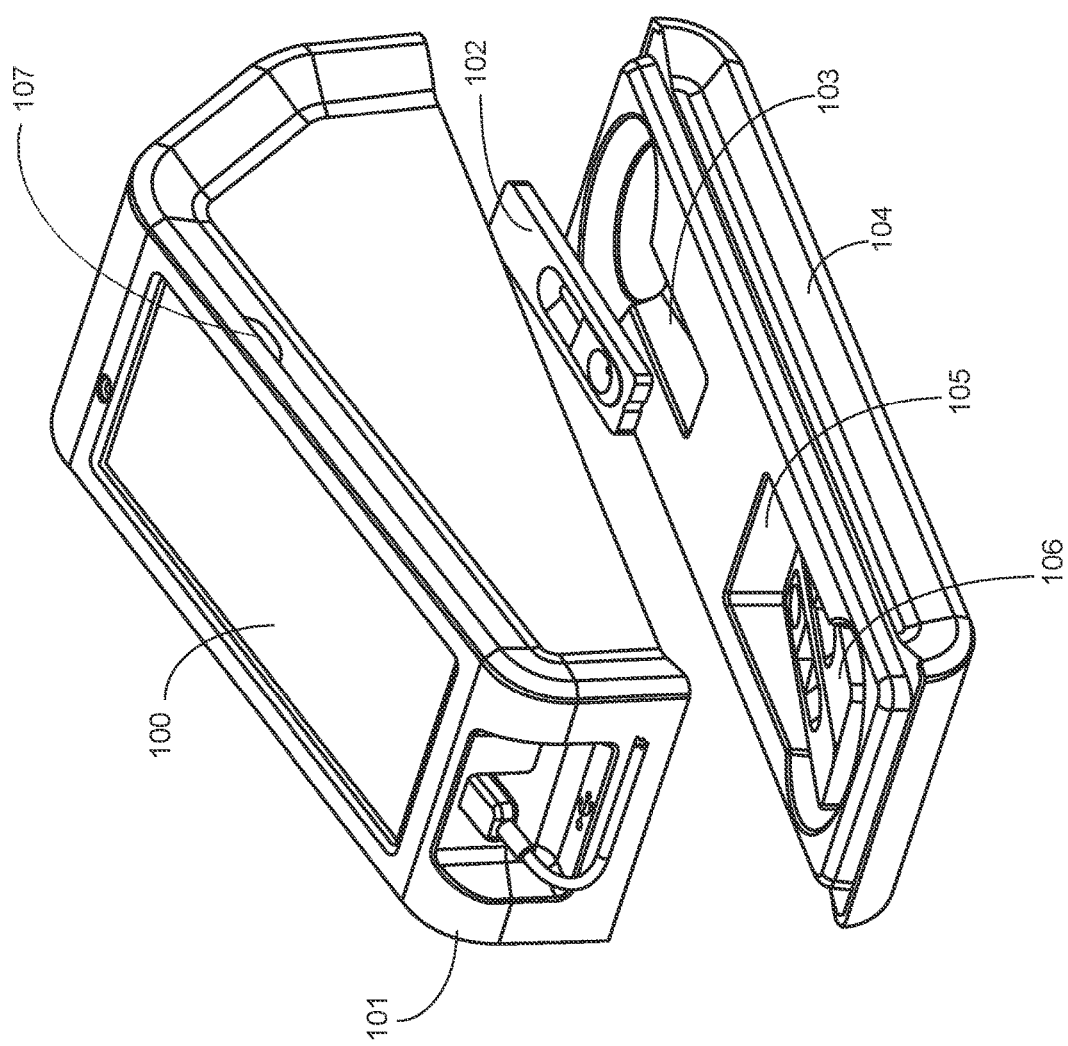
FIG. 1 depicts an embodiment of a device having a body for receiving a digital reader and base for receiving a lateral flow assay cartridge.

A device for receiving a digital reader and a lateral flow assay (LFA) cartridge and systems incorporating the same are provided. Aspects of the device include a body having a frame configured to receive the digital reader and a base plate having one or more LFA cartridge receiving positions for holding one or more LFA cartridges at a fixed orientation relative to a planar space defined by the frame. Also provided are methods for using the device to read a result indicative of the presence or absence of an analyte in a sample.

Before exemplary embodiments of the present invention are described, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a LFA cartridge" includes a plurality of LFA cartridges, and so forth.

It is further noted that the claims may be drafted to exclude any element which may be optional. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. To the extent such publications may set out definitions of a term that conflicts with the explicit or implicit definition of the present disclosure, the definition of the present disclosure controls.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10 % of the particular term and "substantially" and "significantly" mean plus or minus greater than 10 % of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present" or "absent") is used in a relative sense to describe the amount or level of a particular entity (e.g., an analyte). For example, when an analyte is said to be "present" in a test sample, it means the level or amount of this analyte is above a pre-determined threshold; conversely, when an analyte is said to be "absent" in a test sample, it means the level or amount of this analyte is below a pre-determined threshold. The pre-determined threshold may be the threshold for detectability associated with the particular test used to detect the analyte or any other threshold. When an analyte is "detected" in a sample it is "present" in the sample; when an analyte is "not detected" it is "absent" from the sample. Further, a sample in which an analyte is "detected" or in which the analyte is "present" is a sample that is "positive" for the analyte. A sample in which an analyte is "not detected" or in which the analyte is "absent" is a sample that is "negative" for the analyte.

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "analyte" refers to a compound or composition to be detected and/or measured. The analyte may be measured, for example, by specific binding to a binding agent (e.g., a ligand, receptor, enzyme, antibody, antigen, aptamer, or antibody mimetic). In some embodiments, the analyte is a protein or a nucleic acid. In some embodiments, the analyte is an antigen, an antibody, and/or a receptor. In some embodiments, the analyte is a fragment of an antigen, an antibody, and/or a receptor. In some embodiments, the analyte is an analyte analogue or an analyte derivative (e.g., an analyte altered by chemical or biological methods). In some embodiments, an analyte is an epitope.

In some embodiments, the term "analyte" refers to a protein and/or a nucleic acid from a pathogen such as a viral, bacterial, fungal, or parasitic pathogen. In some embodiments, the term "analyte" refers to an antibody against such a pathogen.

In some embodiments, the term "analyte" refers to a protein and/or a nucleic acid from the SARS-CoV-2 virus. In some embodiments, the analyte is a fragment and/or epitope of a protein and/or nucleic acid from the SARS-CoV-2 virus.

As used herein, the term "antibody" refers to an immunoglobulin, an immunoglobulin derivative, and/or an immunoglobulin fragment. An antibody comprises an area on its surface or in a cavity that specifically binds to a particular spatial and/or polar organization of another molecule. The antibody can be monoclonal or polyclonal and can be prepared by techniques that are well known in the art such as, for example, immunization of a host and collection of sera or hybrid cell line technology. Accordingly, the term "antibody" refers to an immunoglobulin, derivatives thereof that maintain specific binding ability, and proteins having a binding domain that is homologous or substantially and/or effectively homologous to an immunoglobulin binding domain. These proteins may be derived from natural sources or partly or wholly synthetically produced. The antibody may be a member of any immunoglobulin class, including any of the human classes: IgG, IgM, IgA, IgD, and IgE. The basic antibody structural unit is known to comprise a tetramer. Each tetramer is composed of two identical pairs of polypeptide chains, each pair having one "light" (about 25 kDa) and one "heavy" chain (about 50-70 kDa). The amino-terminal portion of each chain includes a variable region of about 100 to 110 or more amino acids primarily responsible for antigen recognition. The carboxy-terminal portion of each chain defines a constant region primarily responsible for effector function. Light chains are classified as either kappa or lambda. Heavy chains are classified as gamma, mu, alpha, delta, or epsilon, and define the antibody isotype as IgG, IgM, IgA, IgD, or IgE, respectively. Within light and heavy chains, the variable and constant regions are joined by a "J" region of about 12 or more amino acids, with the heavy chain also including a "D" region of about 10 more amino acids. (See generally, Fundamental Immunology (See, e.g., Paul, Fundamental Immunology, 3rd Ed., 1993, Raven Press, New York). The variable regions of each light/heavy chain pair form the antibody binding site. The chains all exhibit the same general structure of relatively conserved framework regions (FR) joined by three hypervariable regions, also called complementarily determining regions or CDRs. The CDRs from the two chains of each pair are aligned by the framework regions, enabling binding to a specific epitope. CDR and FR residues are delineated according to the standard sequence definition of Kabat et al. (5th ed., 1991) *Sequences of Proteins of Immunological Interest* (National Institutes of Health publication 91-3242, incorporated herein by reference). An alternative structural definition has been proposed by Chothia et al. (1987) J. Mol.

Biol. 196: 901-917; (1989) Nature 342: 878-883; and (1989) *J. Mol. Biol.* 186: 651-663, each of which is incorporated herein by reference.

As used herein, the term "antibody fragment" refers to any derivative of an antibody that comprises an amino acid sequence that is less than a full-length antibody amino acid sequence. In exemplary embodiments, the antibody fragment retains at least a significant portion of the specific binding ability of the full-length antibody. Examples of antibody fragments include, but are not limited to, Fab, Fab', F(ab')$_2$, scFv, Fv, dsFv diabody, and Fd fragments. The antibody fragment may be produced by any means. For instance, the antibody fragment may be enzymatically or chemically produced by fragmentation of an intact antibody, it may be recombinantly produced from a gene encoding the partial antibody sequence, or it may be wholly or partially synthetically produced. For example, in some embodiments, the term Fab fragment may refer to a binding fragment resulting from papain cleavage of an intact antibody and the terms Fab' and F(ab')$_2$ may refer to binding fragments of intact antibodies generated by pepsin cleavage. As used herein, the term "Fab" is used to refer generically to double chain binding fragments of intact antibodies having at least substantially complete light and heavy chain variable domains sufficient for antigen-specific bindings and parts of the light and heavy chain constant regions sufficient to maintain association of the light and heavy chains. Usually, Fab fragments are formed by complexing a full-length or substantially full-length light chain with a heavy chain comprising the variable domain and at least the CH1 domain of the constant region The antibody fragment may optionally be a single chain antibody fragment. Alternatively, the fragment may comprise multiple chains that are linked together, for instance, by disulfide linkages. The fragment may also optionally be a multimolecular complex. A functional antibody fragment will typically comprise at least about 50 amino acids and more typically will comprise at least about 200 amino acids.

As used herein, the terms "specifically binds to" or "specifically immunoreactive with", e.g., when referring to an antibody, antibody fragment, antigen, or other binding moiety, refers to a binding reaction that is determinative of the presence of a target analyte in the presence of a heterogeneous population of proteins and/or other biologics. Thus, under designated assay conditions, the specified binding moieties bind preferentially to a particular target analyte and do not bind in a significant amount to other components present in a test sample. Specific binding to a target antigen under such conditions may require a binding moiety that is selected for its specificity for a particular target analyte. A variety of immunoassay formats may be used to select antibodies that are specifically immunoreactive with a particular protein. For example, solid-phase ELISA immunoassays are routinely used to select monoclonal antibodies specifically immunoreactive with an antigen. See Harlow and Lane (1988) *Antibodies, A Laboratory Manual*, Cold Spring Harbor Publications, New York, for a description of immunoassay formats and conditions that can be used to determine specific immunoreactivity. Typically, a specific or selective reaction is at least twice background signal or noise and more typically more than 10 to 100 times background. Specific binding between an antibody or other binding agent and an antigen generally means a binding affinity of at least $10^6$ M$^{-1}$. Preferred binding agents bind with affinities of at least about $10^7$ M$^{-1}$, and preferably $10^8$ M$^{-1}$ to $10^9$ M$^{-1}$ or $10^{19}$ M$^{-1}$.

As used herein, the term "epitope" refers to an antigenic determinant that is capable of specific binding to an antibody. Epitopes usually comprise chemically active surface groupings of molecular moieties, e.g., as amino acids or sugar side chains, and usually have specific three-dimensional structural characteristics and/or specific charge characteristics. Conformational and nonconformational epitopes are distinguished in that the binding to the former but not the latter is lost in the presence of denaturing solvents. Epitopes can include non-contiguous amino acids, as well as contiguous amino acids.

As used herein, the term "sample" refers to any sample comprising an analyte or suspected of comprising an analyte. Accordingly, the term "sample" refers to a material to be tested for the presence or amount of an analyte, e.g., a pathogen or a part or component thereof. Preferably, a sample is a fluid sample, preferably a liquid sample. For example, a sample may be a bodily fluid such as blood, serum, plasma, ocular fluid, urine, mucus, semen, nasopharyngeal swab fluid, throat swab, tears, sweat, or saliva. Viscous liquid, semi-solid, or solid specimens may be used to create liquid solutions, eluates, suspensions, or extracts that can be samples. For example, throat or genital swabs may be suspended in a liquid solution to make a sample.

As used herein, the term "test strip" can include one or more bibulous or non-bibulous materials. If a test strip comprises more than one material, the one or more materials are preferably in fluid communication. One material of a test strip may be overlaid on another material of the test strip, such as for example, filter paper overlaid on nitrocellulose. Alternatively or in addition, a test strip may include a region comprising one or more materials followed by a region comprising one or more different materials. In this case, the regions are in fluid communication and may or may not partially overlap one another. Suitable materials for test strips include, but are not limited to, materials derived from cellulose, such as filter paper, chromatographic paper, nitrocellulose, and cellulose acetate, as well as materials made of glass fibers, nylon, dacron, PVC, polyacrylamide, cross-linked dextran, agarose, polyacrylate, ceramic materials, and the like. The material or materials of the test strip may optionally be treated to modify their capillary flow characteristics or the characteristics of the applied sample. For example, the sample application region of the test strip may be treated with buffers to correct the pH, salt concentration, or specific gravity of an applied sample to optimize test conditions.

The material or materials can be a single structure such as a sheet cut into strips or it can be several strips or particulate material bound to a support or solid surface such as found, for example, in thin-layer chromatography and may have an absorbent pad either as an integral part or in liquid contact. The material can also be a sheet having lanes thereon, capable of spotting to induce lane formation, wherein a separate assay can be conducted in each lane. The material can have a rectangular, circular, oval, triangular, or other shape provided that there is at least one direction of traversal of a test solution by capillary migration. Other directions of traversal may occur such as in an oval or circular piece contacted in the center with the test solution. However, the main consideration is that there be at least one direction of flow to a predetermined site.

The support for the test strip, where a support is desired or necessary, will normally be water insoluble, frequently non-porous and rigid but may be elastic, usually hydrophobic, and porous and usually will be of the same length and width as the strip but may be larger or smaller. The support material can be transparent, and, when a test device of the present technology is assembled, a transparent support material can be on the side of the test strip that can be viewed by the user, such that the transparent support material forms a protective layer over the test strip where it may be exposed to the external environment, such as by an aperture in the front of a test device. A wide variety of non-mobilizable and non-mobilizable materials, both natural and synthetic, and combinations thereof, may be employed provided only that the support does not interfere with the capillary action of the material or materials, or non-specifically bind assay components, or interfere with the signal producing system. Illustrative polymers include polyethylene, polypropylene, poly(4-methylbutene), polystyrene, polymethacrylate, poly(ethylene terephthalate), nylon, poly(vinyl butyrate), glass, ceramics, metals, and the like. Elastic supports may be made of polyurethane, neoprene, latex, silicone rubber and the like.

As used herein, the term "control zone" or "control line" is a region of a test strip in which a label can be observed to shift location, appear, change color, or disappear to indicate that an assay performed correctly. Detection or observation of the control zone (e.g., of a control line) may be done by any convenient means, depending upon the particular choice of label, especially, for example but not limited to, visually, fluorescently, by reflectance, radiographically, and the like. As will be described, the label may or may not be applied directly to the control zone, depending upon the design of the control being used.

As used herein, the term "label" refers to any molecule bound to a specific binding member that can produce a detectable signal. In the present invention, the label may be inert and provide a signal by concentrating in the detection zone, it may serve solely as a binding site for a member of the signal producing system, or it may spontaneously produce a detectable signal or may produce a detectable signal in conjunction with a signal producing system. The label may be isotopic or nonisotopic. In some embodiments, the label comprises a gold colloid, latex beads, a dye, a fluorescent moiety, or other detectable entity.

"Proximal end" refers to the end of a test device or test strip that includes the sample application aperture of the test device and/or the sample application zone of the test strip.

As used herein, the term "reagent zone" refers to a region of a test strip where reagent is provided. The reagent zone can be on a reagent pad, a separate segment of bibulous or non-bibulous material included on the test strip, or it can be a region of a bibulous or non-bibulous material of a test strip that also includes other zones, such as an analyte detection zone. The reagent zone can carry a detectable label, which may be a direct or indirect label. Preferably the reagent is provided in a form that is immobile in the dry state and mobile in the moist state. A reagent can be a specific binding member, an analyte or analyte analog, an enzyme, a substrate, indicators, components of a signal producing system, chemicals or compounds such as buffering agents, reducing agents, chelators, surfactants, etc., that contribute to the function of the test strip assay.

As used herein, the term "sample application aperture" refers to the portion of a test device where an opening in the test device provides access to the sample application zone of the test strip.

As used herein, the term "sample application zone" is the portion of a test strip where sample is applied. In some embodiments, a "sample pad" comprises a sample application zone.

As used herein, the term "specific binding member" refers to one of two different molecules having an area on the surface or in a cavity that specifically binds to and is thereby defined as complementary with a particular spatial and polar organization of the other, second molecule. The members of the specific binding pair are referred to as ligand and receptor (antiligand). These will usually be members of an immunological pair such as antigen-antibody, although other specific binding pairs, e.g., biotin-avidin, hormone-hormone receptor, nucleic acid duplexes, IgG-protein A, DNA-DNA, DNA-RNA, and the like, are not immunological pairs but are included in the definition. In the case of binding pairs such as avidin-biotin, reagent can be labeled with one member of this pair, and a detection zone can include the other member of this pair in a capture type assay. Other general types of assays using avidin-biotin pairs or binding pairs of this type are known in the art. An antibody (e.g., a labeled antibody) can be used as a reagent for the detection of an antigen that binds with or specifically binds with such an antibody. An antigen or epitope (e.g., a labeled antigen) can be used as a reagent for the detection of antibodies that bind with or specifically bind with such an antigen or epitope.

As used herein, the term "test results zone" is a region of a test strip that provides a detectable signal indicating the presence of the analyte. The test results zone can include an immobilized binding reagent specific for an analyte ("specific binding member") and/or an enzyme that reacts with the analyte. A test results zone can include one or more analyte detection zones, e.g., a "test line". Other substances that may allow or enhance detection of the analyte, such as substrates, buffers, salts, may also be provided in the test results zone. One or more members of a signal producing system may be bound directly or indirectly to the detection zone. A test results zone can optionally include one or more control zones (e.g., a "control line") that provide indication that the test has been performed properly.

The terms "identical" or percent "identity," in the context of two or more nucleic acids or polypeptide sequences, refer to two or more sequences or subsequences that are the same or have a specified percentage of nucleotides or amino acid residues that are the same, when compared and aligned for maximum correspondence, as measured using one of the following sequence comparison algorithms or by visual inspection. The phrase "substantially identical," in the context of two nucleic acids, refers to two or more sequences or subsequences that have at least 80%, preferably 85%, most preferably 90-95% nucleotide identity, when compared and aligned for maximum correspondence, as measured using one of the following sequence comparison algorithms or by visual inspection. For amino acid sequences, "substantially identical" refers to two or more sequences or subsequences that have at least 60% identity, preferably 75% identity, and more preferably 90-95% identify, when compared and aligned for maximum correspondence, as measured using one of the following sequence comparison algorithms or by visual inspection. Preferably, the substantial identity exists over a region of the nucleic acid or amino acid sequences that is at least about 10 residues in length, more preferably over a region of at least about 20 residues, and most preferably the sequences are substantially identical over at least about 100 residues. In a most preferred embodiment, the sequences are substantially identical over the entire length of the specified regions (e.g., coding regions).

For sequence comparison, typically one sequence acts as a reference sequence, to which test sequences are compared. When using a sequence comparison algorithm, test and reference sequences are input into a computer, subsequence coordinates are designated, if necessary, and sequence algorithm program parameters are designated. The sequence comparison algorithm then calculates the percent sequence identity for the test sequence(s) relative to the reference sequence, based on the designated program parameters. Optimal alignment of sequences for comparison can be conducted, e.g., by the local homology algorithm of Smith & Waterman, Adv. Appl. Math. 2:482 (1981), by the homology alignment algorithm of Needleman & Wunsch, J. Mol. Biol. 48:443 (1970), by the search for similarity method of Pearson & Lipman, Proc. Nat'l. Acad. Sci. USA 85:2444 (1988), by computerized implementations of these algorithms (GAP, BESTFIT, FASTA, and TFASTA in the Wisconsin Genetics Software Package, Genetics Computer Group, 575 Science Dr., Madison, Wis.), or by visual inspection (see generally, Current Protocols in Molecular Biology, F. M. Ausubel et al., eds., Current Protocols, a joint venture between Greene Publishing Associates, Inc. and John Wiley & Sons, Inc., (1995 Supplement) (Ausubel)).

Examples of algorithms that are suitable for determining percent sequence identity and sequence similarity are the BLAST and BLAST 2.0 algorithms, which are described in Altschul et al. (1990) J. Mol. Biol. 215: 403-410 and Altschuel et al. (1977) Nucleic Acids Res. 25: 3389-3402, respectively. Software for performing BLAST analyses is publicly available through the National Center for Biotechnology Information (www.ncbi.nlm.nih.gov). This algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold (Altschul et al, supra). These initial neighborhood word hits act as seeds for initiating searches to find longer HSPs containing them. The word hits are then extended in both directions along each sequence for as far as the cumulative alignment score can be increased. Cumulative scores are calculated using, for nucleotide sequences, the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The BLASTN program (for nucleotide sequences) uses as defaults a wordlength (W) of 11, an expectation (E) of 10, M=5, N=−4, and a comparison of both strands. For amino acid sequences, the BLASTP program uses as defaults a wordlength (W) of 3, an expectation (E) of 10, and the BLOSUM62 scoring matrix (see Henikoff & Henikoff, Proc. Natl. Acad. Sci. USA89:10915 (1989)).

A further indication that two nucleic acids or polypeptides are substantially identical is that the polypeptide encoded by the first nucleic acid is immunologically cross-reactive with the polypeptide encoded by the second nucleic acid, as described below. Thus, a polypeptide is typically substantially identical to a second polypeptide, for example, where the two peptides differ only by conservative substitutions. Another indication that two nucleic acid sequences are substantially identical is that the two molecules hybridize to each other under stringent conditions, as described below.

"Conservatively modified variations" of a particular polynucleotide sequence refers to those polynucleotides that encode identical or essentially identical amino acid sequences, or where the polynucleotide does not encode an amino acid sequence, to essentially identical sequences. Because of the degeneracy of the genetic code, a large number of functionally identical nucleic acids encode any given polypeptide. For instance, the codons CGU, CGC, CGA, CGG, AGA, and AGG all encode the amino acid arginine. Thus, at every position where an arginine is specified by a codon, the codon can be altered to any of the corresponding codons described without altering the encoded polypeptide. Such nucleic acid variations are "silent substitutions" or "silent variations," which are one species of "conservatively modified variations." Every polynucleotide sequence described herein which encodes a polypeptide also describes every possible silent variation, except where otherwise noted. Thus, silent substitutions are an implied feature of every nucleic acid sequence which encodes an amino acid. One of skill will recognize that each codon in a nucleic acid (except AUG, which is ordinarily the only codon for methionine and UGG, the only codon for tryptophan) can be modified to yield a functionally identical molecule by standard techniques. In some embodiments, the nucleotide sequences that encode the enzymes are preferably optimized for expression in a particular host cell (e.g., yeast, mammalian, plant, fungal, and the like) used to produce the enzymes.

Similarly, "conservative amino acid substitutions," in one or a few amino acids in an amino acid sequence are substituted with different amino acids with highly similar properties are also readily identified as being highly similar to a particular amino acid sequence, or to a particular nucleic acid sequence which encodes an amino acid. Such conservatively substituted variations of any particular sequence are a feature of the present invention. Individual substitutions, deletions or additions which alter, add or delete a single amino acid or a small percentage of amino acids (typically less than 5%, more typically less than 1%) in an encoded sequence are "conservatively modified variations" where the alterations result in the substitution of an amino acid with a chemically similar amino acid. Conservative substitution tables providing functionally similar amino acids are well known in the art. See, e.g., Creighton (1984) Proteins, W.H. Freeman and Company.

Device

Devices, systems, and methods are described herein that relate to a device for receiving a digital reader and a lateral flow assay (LFA) cartridge. Various aspects of the device will now be described in greater detail below.

Aspects of the device may include two modules: a body configured for receiving a digital reader and a base plate configured for receiving an LFA cartridge. In certain embodiments, the device may be used for digitally reading an assay region and/or a control region of an LFA cartridge.

The body of the device may have any suitable structure for receiving a digital reader. The body may include a wall enclosing a space, the wall having a top portion and a bottom portion. The wall may have any suitable dimensions. In some cases, the wall has a height ranging from 0.5 inches to 7 inches such as, e.g., from 1 inch to 6 inches, from 2 inches to 5 inches, or from 3 inches to 4 inches. In some cases, the wall encloses a space having a length ranging from 3 inches to 10 inches such as, e.g., from 4 inches to 9 inches, from 5 inches to 8 inches, or from 5 inches to 7 inches. In some cases, the wall encloses a space having a width ranging from 1 inch to 6 inches such as, e.g., from 2 inches to 5 inches, from 2 inches to 4 inches, or from 3 inches to 4 inches. The body may further include a frame coupled to the top portion of the wall, the frame configured to receive the digital reader. The frame may have any suitable dimensions for receiving a variety of digital readers including, e.g., a smart phone, digital camera, etc. In some cases, the frame extends around the entire body of the digital reader, e.g., around the edges of the digital reader. In some cases, the frame extends around the entire body of the digital reader but leaves the screen, power port, and/or on/off switch exposed. In some cases, the frame is dimensioned to receive a portion of the body of a digital reader, e.g., half of the body of a digital reader. The body of the device may further include a mating structure defined by the bottom portion of the wall, wherein the mating structure is configured to removably couple to the base plate. The mating structure may have any suitable shape such as, e.g., a rectangular shape, a square shape, a circular shape, a triangular shape, a pentagonal shape, etc.

The base plate of the device may have any suitable structure for receiving one or more LFA cartridges, e.g., at least two LFA cartridges. The base plate may include a first surface and a second surface defining a space there between, the space including a first LFA cartridge receiving portion and/or a second LFA cartridge receiving portion therein. In some cases, the first LFA cartridge receiving portion comprises a substantially planar first support surface that receives and holds a LFA cartridge in a releasable manner. In some cases, the second LFA cartridge receiving portion comprises a substantially planar second support surface that receives and holds a LFA cartridge in a releasable manner. In some cases, the first support surface has a first fixed orientation, and the second support surface has a second fixed orientation to optimize the detection of an optically detectable marking (e.g., an optically detectable line, an optically detectable band) present on an LFA cartridge during use of the device. In some cases, the first and second fixed orientations are different. In some cases, the first and second fixed orientations are the same. In certain embodiments, the first surface includes structures for coupling the base plate to the body such as, e.g., a protrusion that snaps into the mating structure of the body. In some cases, at least a portion of the base plate is shaped to mate with the mating structure of the body. In some cases, the at least one portion of the base plate may have any suitable shape such as, e.g., a rectangular shape, a square shape, a circular shape, a triangular shape, a pentagonal shape, etc. In some cases, the base plate has a triangular shape and comprises at least three receiving portions in a triangular arrangement. In some cases, the base plate has a rectangular or square shape and comprises at least four receiving portions in a rectangular or square arrangement. In some cases, the base plate has a pentagonal shape and comprises at least five receiving portions in a pentagonal arrangement.

In some cases, the first support surface of the first LFA cartridge receiving portion is at a first fixed orientation relative to a planar space defined by the frame of the body. In some cases, the first fixed orientation includes a first fixed horizontal angle relative to the planar surface of the frame. As used herein, a "horizontal angle" refers to the angle formed at the intersection between the planar surface extending in the lateral direction and the plane of the first support surface. In some cases, the first fixed horizontal angle is an angle created by the tilt of a latitudinal edge of the first support surface of the receiving portion away from the planar surface defined by the frame such that a first longitudinal edge of the first support surface is brought farther away from the planar surface than a second longitudinal edge. In some cases, the first fixed horizontal angle, e.g., its positive or negative tilt, is determined by the exact position of the illuminating light source with respect to the camera position. In some cases, the first fixed horizontal angle ranges from +1 to +10 degrees, from +2 to +8 degrees, or from +3 to +6 degrees. In some cases, the first fixed horizontal angle ranges from −1 to −10 degrees, from −2 to −8 degrees, or from −3 to −6 degrees. As used herein, a tilt away from the planar surface defined by the frame may be considered to create a positive angle and a tilt toward the planar surface may be considered to create a negative angle. In some cases, the first fixed orientation comprises a first fixed vertical angle relative to the planar surface of the frame. As used herein, a "vertical angle" refers to the angle formed at the intersection between the planar surface extending in the longitudinal direction and the plane of the first support surface. In some cases, the first fixed vertical angle is the angle created by the tilt of a longitudinal edge of the first support surface of the receiving portion towards the planar surface of the frame such that a first latitudinal edge of the receiving portion is brought closer to the planar surface than a second latitudinal edge. In some cases, the first fixed vertical angle, e.g., its positive or negative tilt, is determined by the exact position of the illuminating light source with respect to the camera position. In some cases, the first fixed vertical angle ranges from −1 to −15 degrees, from −3 to −12 degrees, or from −5 to −10 degrees. In some cases, the first fixed vertical angle ranges from +1 to +15 degrees, from +3 to +12 degrees, or from +5 to +10 degrees. In certain embodiments, the first fixed horizontal angle and/or the first fixed vertical angle result in a) less light directly reflected into the camera lens, and/or b) the most homogenous intensity distribution of the reflected light from the result area of the LFA.

In some cases, the second support surface of the second LFA cartridge receiving portion is at a second fixed orientation relative to a planar space defined by the frame of the body. In some cases, the second fixed orientation may be the same as the first fixed orientation and comprise the same fixed horizontal angle and fixed vertical angle as the first fixed orientation. In certain embodiments, the second fixed orientation may be the same as the first fixed orientation such that when the second support surface is positioned before a reader, e.g., a smartphone, the second support surface has the same orientation as the first support surface when positioned before the detector. In some cases, the second fixed orientation may be different from the first fixed orientation and comprise a different fixed horizontal angle and fixed vertical angle. In some cases, the second fixed orientation includes a second fixed horizontal angle relative to the planar surface of the frame. In some cases, the second fixed horizontal angle, e.g., its positive or negative tilt, is determined by the exact position of the illuminating light source with respect to the camera position. In some cases, the second fixed horizontal angle ranges from +1 to +10 degrees, from +2 to +8 degrees, or from +3 to +6 degrees. In some cases, the second fixed horizontal angle ranges from −1 to −10 degrees, from −2 to −8 degrees, or from −3 to −6 degrees. In some cases, the second fixed orientation comprises a second fixed vertical angle relative to the planar surface of the frame. In some cases, the second fixed vertical angle, e.g., its positive or negative tilt, is determined by the exact position of the illuminating light source with respect to the camera position. In some cases, the second fixed vertical angle ranges from −1 to −15 degrees, from −3 to −12 degrees, or from −5 to −10 degrees. In some cases, the second fixed vertical angle ranges from +1 to +15 degrees, from +3 to +12 degrees, or from +5 to +10 degrees. In certain embodiments, the second fixed horizontal angle and/or the second fixed vertical angle results in a) less light directly reflected into the camera lens, and/or b) the most homogenous intensity distribution of the reflected light from the result area of the LFA.

In certain aspects, the receiving portions may have different sizes, for example, the first receiving portion may be bigger such that it can releasably hold a first LFA cartridge that has a bigger size than a second LFA cartridge that may fit into a second receiving portion.

In some cases, the body and the base plate are coupled by way of the mating structure defined by the body and the protrusion of the base plate, as described above. In some cases, the orientation of the base plate relative to the body of the device may be adjustable. In some cases, the mating structure and at least a portion of the base plate have a shape having a line of symmetry such that the mating structure and the base plate can be coupled in at least two orientations by rotation of one of the mating structure and the base plate. In some cases, the rotation positions the first receiving portion before an imager of a digital reader held in the body of the device. In some cases, the rotation positions the second receiving portion before an imager of a digital reader held in the body of the device.

The device may be fabricated from any suitable material. In some cases, the device is manufactured from an opaque material including, but not limited to, plastic, metal, wood, etc. In certain embodiments, the device is manufactured from a light absorbing material including, but not limited to, nanotubes, dark colored materials, including dark paint, plastic, paper, wood, and the like. In some cases, the first surface of the base plate faces an interior of the device and comprises a light absorbing material.

The device may further include a threshold intensity line. The threshold intensity line may serve as an internal intensity standard. The threshold intensity line may be used to flag for example a false negative result. For example, if the threshold intensity line is not detected by the digital reader, the LFA cartridge may not be read or the results from reading of the LFA cartridge may be discarded. In some aspects, if the threshold intensity line is not detected by the digital reader, the settings on the digital reader may be adjusted, e.g., a flash function of the digital reader may be activated to increase illumination in the device and/or the focal plane of the camera of the reader may be changed. In some aspects, if the threshold intensity line is not detected by the digital reader, the user may be directed to clean the camera lens of the reader. In some cases, the threshold intensity line may be used to calculate a validity score and distinguish valid and invalid reads of an assay region.

In some cases, the reading of the threshold intensity line may be used to determine that the digital reader, e.g., the smartphone camera, is functioning properly or may be used to identify suitable readers for use with the device. In some cases, the detection of the threshold intensity line is used to determine the validity of the assay result under various conditions (e.g., ambient light intensity, degree of contamination on optical surfaces, auto-focus precision of a digital reader). In some cases, the device includes two or more threshold intensity lines.

In some cases, the base plate of the device includes a threshold intensity line present on the first surface and disposed adjacent to the first LFA cartridge receiving portion or the second LFA cartridge receiving portion. In some cases, the device includes a first threshold intensity line present on the first surface of the base plate and disposed adjacent to the first LFA cartridge and a second threshold intensity line present on the first surface of the base plate and disposed adjacent to the second LFA cartridge. In some cases, the threshold intensity line is present in the same plane as the assay region of a LFA cartridge during image capture by the digital reader. In some cases, the threshold intensity line is present in the same focal path as the assay region during image capture by the digital reader. In some cases, the threshold intensity line is present in a different plane from the assay region during image capture by the digital reader.

In some cases, the threshold intensity line is present on a substantially planar solid support. The solid support may be positioned on the first surface of the base plate, e.g., by adhering the solid support to the first surface. In some cases, the solid support may be inserted into cavity created in the base plate, where the cavity opens to the first surface. A solid support, used in its conventional sense, refers to a surface upon which a threshold intensity line may be generated. A solid support may be configured as a substantially planar substrate. Suitable solid supports can have a variety of shapes, sizes, forms, and compositions and can be derived from naturally occurring materials, naturally occurring materials that have been synthetically modified, or synthetic materials. Non-limiting examples of suitable solid support materials include, but are not limited to, nitrocellulose, glasses, silicas, ceramics, teflons, metals (for example, gold, platinum, and the like), or other materials. Non-limiting examples of solid support materials include, but are not limited to polymeric materials, including plastics (for example, polytetrafluoroethylene, polypropylene, polystyrene, polycarbonate, and blends thereof, and the like), polysaccharides such as agarose and dextran, polyacrylamides, polystyrenes, polyvinyl alcohols, copolymers of hydroxyethyl methacrylate and methyl methacrylate, and the like. A solid support may be homogenous or a composite structure of two or more different materials, e.g., where the solid support includes a first base material that is coated on a surface with one or more additional different coating materials. In certain embodiments, the solid support is fabricated from a material having a reflective surface. In some cases, the solid support is a glass substrate. In some cases, the solid support includes a ceramic sheet. The solid support may be substantially flat. The solid support may be substantially circular, square, or rectangular in shape or may have an irregular shape.

The threshold intensity line may be generated on the solid support by any suitable method. Non-limiting examples of means for generating the threshold intensity line include vapor coating, scratching (e.g., by a steel or diamond needle), etching, photolithography, atomic layer deposition, laser scribing or etching, laser ablation, flexographic printing and ink-jet printing. The threshold intensity line may be a line of similar width as a signal line in a lateral flow assay. In some cases, the threshold intensity line has a width ranging from 0.1 mm to 2 mm, from 0.5 mm to 1.5 mm, from 0.8 mm to 1.2 mm.

The threshold intensity line may have a detection intensity close to the lowest detection intensity required to be visually readable by the naked eye. In some cases, the threshold intensity line has a reflection intensity that is lower than the surface reflection intensity of the solid support. In some cases, the threshold intensity line has a reflection intensity that is at least 0.01-30%, at least 0.03-20%, or at least 0.05-15% lower than the surface reflection intensity of the solid support. In some cases, the threshold intensity line has a reflection intensity that is at least 0.1-10% lower than the surface reflection intensity of the surface of the solid support. In some cases, the device includes one or more threshold intensity lines, where each of the threshold intensity lines has the same intensity. In some cases, the device includes one or more threshold intensity lines, where each of the threshold intensity lines has a different intensity.

In some cases, a threshold intensity line is generated in a white colored ceramic sheet by scratching a straight line into the surface by using a steel or diamond needle applied at a defined force and at a defined position, resulting in an at least 0.1% lower intensity for this line region compared to other regions when a digital image of both regions is taken with a reader, e.g., a smart phone.

In some cases, a threshold intensity line is generated in a glass substrate modified at the surface or in the inner body by applying a focused laser at a defined position, resulting in an at least 0.1% lower or higher intensity for this line region compared to other regions when a digital image of both regions is taken with a reader, e.g., a smart phone.

In some cases, a threshold intensity line is generated in a glass substrate backed by bright (e.g., white) color that gets a line deposited by metal vapor (using a mask to define the line position) and using the deposition time to determine the line intensity, resulting in an at least 0.1% lower intensity for this line region compared to other regions when a digital image of both regions is taken with a reader, e.g., a smart phone.

Systems

The present disclosure also provided systems which, e.g., find use in reading a lateral flow assay cartridge. The systems include the device for receiving a digital reader and a LFA cartridge, as described above.

In some cases, a system of the present disclosure includes one or more LFA cartridges. A typical LFA cartridge can include a housing containing a test strip, e.g., a plastic strip or a ceramic sheet laminated with a porous material that permits lateral flow of liquid. The LFA cartridge may include a sample application region and an analysis region. In some cases, an LFA cartridge includes a region comprising an optically detectable assay result. In some cases, the one or more LFA cartridges includes at least two LFA cartridges, at least three LFA cartridges, at least four LFA cartridges, at least five LFA cartridges, or at least six LFA cartridges.

In one type of LFA cartridge, the test strip is divided into four regions, which can be made of only one kind of material or several kinds of material (e.g., up to four different kinds of materials). The first region is for sample addition. It functions to remove viscous and particulate materials in the sample and also to condition the sample solution for the reactions in the following domains. The second domain is a mobile-phase with a color conjugate. The color conjugate may be made from conjugation between a visible color marker (e.g., colored beads, colloidal gold, fluorescent dyes, etc.) and a detection antibody. The detection antibody can bind a specific antigen in the sample (e.g., an analyte of interest or a positive control substance) and forms an antigen-color conjugate complex. The third region of the LFA cartridge is a solid-phase with immobilized capture antibody. The capture antibody can bind the antigen of the antigen-color conjugate complex and forms capture antibody-antigen-color conjugate complex sandwich. The fourth region is for solution absorption. It draws sample solution towards it continuously.

During the testing, sample added to the first region flows to the second region. If the antigen is present in the sample, it will bind the color conjugate to form antigen-color conjugate complex. This complex then migrates to the third region to bind the capture antibody and forms the capture antibody-antigen-color conjugate complex sandwich. Since the capture antibody is immobilized in the third region, the sandwich shows as a visible color signal or a fluorescent signal, depending on the dye type, on the site of the capture antibody. If there is no antigen in the sample, no sandwich can be formed and hence no visible color signal can be seen in the third domain. This is a so-called non-competitive immunoassay or a sandwich assay where the amount of signal is directly proportional to the concentration of the analyte of interest in the sample.

In some cases, the analyte(s) of interest and a positive control can be detected on various target lines, respectively, with various reporters. The reporters for each of the various target lines may be the same or different. Examples of suitable reporters include, but are not limited to, visible and fluorescent dyes, latex beads, enzymes, gold nanoparticles, silver nanoparticles, quantum dots, and the like.

Lateral-flow chromatographic immunoassay cassettes can also be adapted for competitive immunoassays. In a competitive immunoassay, the analyte of interest in the unknown sample competes for binding to an antibody with a labeled analyte. In a competitive assay, the labeled analyte is able to provide a known signal. In the assay, the amount of labeled analyte bound to the antibody is measured and any reduction in the known signal is attributed to the presence of the analyte in the sample. That is, in this method, the response will be inversely related to the concentration of analyte in the unknown. This is because the greater the response, the less antigen in the unknown was available to compete with the labeled antigen.

Lateral-flow chromatographic immunoassay cassettes may be adapted for assaying a number of different analyte types. For example, immunoassay cassettes have been adapted or may in the future be adapted for blood glucose testing, metabolic testing (e.g., thyroid stimulating hormone), blood gas and electrolytes analysis, rapid coagulation testing, rapid cardiac markers diagnostics, drugs of abuse screening, urine testing, pregnancy testing, fecal occult blood analysis, food pathogen screening, complete blood count ("CBC"), hemoglobin diagnostics, infectious disease testing, cholesterol screening, hormone testing, cardiac pulmonary, gastroenterology, urology, dermatology, neurology, pediatrics, surgical, public health, and veterinary and plant pathology testing, combinations thereof, and the like.

In some cases, when a sample is applied to the diffusion strip of the lateral-flow chromatographic assay cartridge, the liquid in the sample carries the analyte of interest through the diffusion strip in flow direction into an analysis zone where it can be captured by a capture ligand line. In some cases, the LFA cartridge includes a first capture ligand line for capturing a first analyte of interest. In some cases, the LFA cartridge includes a second capture ligand line for capturing a second analyte of interest. In some cases, the LFA cartridge includes first and second capture ligand lines having an amount of the analyte of interest or another material pre-bound to the diffusion strip of the lateral-flow chromatographic assay cartridge. The reporter may be a diffusible material that can bind to the capture ligand lines in an amount proportional to the amount of bound ligand is present in each line. In response to illumination by the light source, a reporter bound to each of lines provides a signal that can be used to calculate a calibration curves and, in turn, determine the concentration of the analyte of interest in the sample.

In some cases, the one or more LFA cartridges of the system include an assay region for producing an optically detectable assay result. In some cases, the one or more LFA cartridges of the system include a positive control region in addition to an assay region for producing an optically detectable marking. In some cases, the assay region includes a positive control line for determining that the assay was performed correctly.

In some cases, the systems include a digital reader. Suitable digital readers for use with the subject device include, but are not limited to, a smart phone, a digital camera, etc. In some cases, the digital reader includes a computing device comprising an automatic camera, a light source, and a touch screen. In certain embodiments, the digital reader is a camera phone (e.g., an Apple brand iPhone). In certain embodiments, the digital reader can be essentially any camera phone or digital camera. In certain embodiments, the digital camera device is a camera phone or digital camera that has an onboard image processing capability and the ability to communicate wirelessly with a database.

In some cases, one or more embodiments of the invention may be practiced with mobile consumer computing devices. Mobile consumer computing devices or more simply, mobile consumer devices, can be any of a broad range of computing devices designed or optimized for portability and for personal use. Mobile consumer devices can take a variety of forms, ranging from more traditional notebook and netbook computers to an emerging and rapidly growing market of handheld devices, including smart phones (e.g., the APPLE IPHONE, ANDROID phones, WINDOWS phones, SYMBIAN phones), tablet computers (e.g., the APPLE IPAD, ANDROID tablets), gaming devices (e.g., NINTENDO or PLAYSTATION portable gaming devices, the APPLE IPOD), multimedia devices (e.g., the APPLE IPOD), and combinations thereof. Many of these devices can enable rich user-interactivity by including combinations of output, input, and other sensory devices, such as touch- or pressure-sensitive displays (using capacitive or resistive technologies, for example), still and video cameras, Global Positioning System (GPS) receivers, magnetic compasses, gyroscopes, accelerometers, light sensors, proximity sensors, microphones, speakers, etc. These devices can also comprise a variety of communications devices, such as combinations of cellular modems (e.g., Global System for Mobile Communications (GSM), Code division multiple access (CDMA)), Wireless Fidelity (Wi-Fi) radios, Bluetooth radios, Near Field Communication (NFC) devices, etc. Many mobile consumer devices are expandable, such that a user can add new hardware and functionality not present during manufacture of the device. It will be appreciated that as the market for mobile consumer devices expands and develops, the functionality of these devices will also expand to utilize new and improved user-interaction devices and communications devices. The embodiments described herein are expansive and can also utilize any future developments in the field of mobile consumer devices.

The digital reader may comprise or be in communication with a computer readable medium. In some cases, the digital reader comprises or is in communication with a computer readable medium comprising instructions that cause a processor to detect the threshold intensity line and indicate successful detection of the threshold intensity line.

In some cases, the digital reader comprises or is in communication with a computer readable medium comprising instructions that cause a processor to: analyze an image comprising the optically detectable assay result as captured by the digital reader and indicate presence or absence of an analyte in a sample assayed by the LFA cartridge. In some cases, the computer readable medium comprises an algorithm that converts the visual readout from the interaction of at least one analyte of interest with at least one capture ligand to a numerical value related to the presence or amount of the at least one analyte of interest present in the sample.

In some cases, the computer readable medium comprises instructions that cause the processor to determine if the threshold intensity line has been detected to determine the validity of the optically detectable assay result. In some cases, the computer readable medium comprises instructions that cause the processor to compare a signal detected from the optically detectable assay result with the signal from the threshold intensity line to determine the validity of the optically detectable assay result. In some cases, the computer readable medium comprises instructions that cause the processor to execute an algorithm that provides an indication of an error when the threshold intensity line is not detected.

In one embodiment, the digital reader further comprises or is in communication with a computer readable medium comprising instructions that cause a processor to perform at least one of: (1) communicating with an electronic medical records system via a wireless communication channel, (2) uploading the amount or concentration of at least one analyte present in a sample to the electronic medical records system, or (3) determining a diagnosis of at least one condition in a subject and to suggest a course of treatment.

Embodiments of the present disclosure may comprise or utilize special purpose or general-purpose computing devices that include computer hardware, such as, for example, one or more processors and system memory, as discussed in greater detail below. Embodiments within the scope of the present invention also include physical and other computer-readable and recordable type media for carrying or storing computer-executable instructions and/or data structures. Such computer-readable recordable media can be any available media that can be accessed by a general purpose or special purpose computer system. Computer-readable media that store computer-executable instructions according to the invention are recordable-type storage media or other physical computer storage media (devices) that are distinguished from mere transitory carrier waves.

Computer-readable media that carry computer-executable instructions are transmission media. Thus, by way of example, and not limitation, embodiments of the invention can comprise at least two distinctly different kinds of computer-readable recordable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer and which are recorded on one or more recordable type medium (device).

A "network" is defined as one or more data links or communication channels that enable the transport of electronic data between computer systems and/or modules and/or other electronic devices. When information is transferred or provided over a network or another communications connection or channel (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the invention may be practiced in network computing environments with many types of computer system configurations, including, personal computers, desktop computers, laptop/notebook computers, message processors, hand-held devices, multi-processor systems, microprocessor-based or programmable consumer electronics, network PCs, minicomputers, mainframe computers, tablets, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Methods

Also provided by the present disclosure are methods of using the subject device. Various steps and aspects of the methods will now be described in greater detail below.

In some cases, the subject methods include a method for reading a result indicative of the presence or absence of an analyte in a sample. The method may comprise applying a sample to the first LFA cartridge, as described above. Samples of interest include physiological samples such as bodily fluids and biological samples, which samples may be saliva, urine tears, semen, sputum, whole blood, plasma, etc. In particular, the device can be used to test for a variety of analytes such as drugs of abuse, hormones, proteins, pathogens, plasma components, antibodies, and the like using suitable LFA cartridges designed for detection of particular analytes. For example, the device is used with an LFA cartridge comprising a binding agent (e.g., detection antibody) that binds specifically to an analyte.

In some embodiments, the device is used to detect a pathogen or antibodies to a pathogen. For example, the device can be used in combination with an LFA cartridge containing a binding agent designed to detect viral, bacterial, fungal, or parasitic pathogens, or antibodies thereto.

Exemplary viruses that can be assayed with the device include, without limitation, Adenoviridae such as, but not limited to, adenovirus; Herpesviridae such as, but not limited to, Herpes simplex, type 1, Herpes simplex, type 2, Varicella-zoster virus, Epstein-Barr virus, human cytomegalovirus, human herpesvirus, type 8; Papillomaviridae such as, but not limited to, human papillomavirus; Polyomaviridae such as, but not limited to, BK virus, and JC virus; Poxviridae such as, but not limited to, smallpox; Hepadnaviridae such as, but not limited to, hepatitis B virus; Parvoviridae such as, but not limited to, parvovirus B19; Astroviridae such as, but not limited to, Caliciviridae such as, but not limited to, Norwalk virus; Picornaviridae such as, but not limited to, coxsackievirus, hepatitis A virus, poliovirus, and rhinovirus; Coronaviridae such as, but not limited to, severe acute respiratory syndrome-related coronavirus, strains, including severe acute respiratory syndrome virus and severe acute respiratory syndrome coronavirus 2; Flaviviridae such as, but not limited to, hepatitis C virus, yellow fever virus, dengue virus, West Nile virus, TBE virus, and Zika virus; Matonaviridae such as, but not limited to, rubella virus; Hepeviridae such as, but not limited to, hepatitis E virus; Retroviridae such as, but not limited to, human immunodeficiency virus (HIV); Orthomyxoviridae such as, but not limited to, influenza virus; Arenaviridae such as, but not limited to, lassa virus; Bunyaviridae such as, but not limited to, Crimean-Congo hemorrhagic fever virus, Hantaan virus; Filoviridae such as, but not limited to, Ebola virus and Marburg virus; Paramyxoviridae such as, but not limited to, measles virus, mumps virus, and parainfluenza virus; Pneumoviridae such as, but not limited to, respiratory syncytial virus; Rhabdoviridae such as, but not limited to, rabies virus; hepatitis D; and Reoviridae such as, but not limited to, rotavirus, orbivirus, coltivirus, and banna virus.

Exemplary pathogenic bacteria that can be assayed with the device include Gram-positive and Gram-negative bacteria, such as rods, bacilli, cocci, coccobacilli, and spirochetes, including, without limitation, *Bacillus* such as, but not limited to, *Bacillus anthracis* and *Bacillus cereus; Bartonella* such as, but not limited to, *Bartonella henselae* and *Bartonella quintana; Bordetella* such as, but not limited to, *Bordetella pertussis; Borrelia* such as, but not limited to, *Borrelia burgdorferi, Borrelia garinii, Borrelia afzelii*, and *Borrelia recurrentis; Brucella* such as, but not limited to, *Brucella abortus, Brucella canis, Brucella melitensis*, and *Brucella suis; Chlamydia* and *Chlamydophila* such as, but not limited to *Chlamydia pneumoniae, Chlamydia trachomatis*, and *Chlamydophila psittaci; Clostridium* such as, but not limited to, *Clostridium botulinum, Clostridium difficile, Clostridium perfringens*, and *Clostridium tetani; Corynebacterium* such as, but not limited to, *Corynebacterium diphtheriae; Enterococcus* such as, but not limited to, *Enterococcus faecalis* and *Enterococcus faecium; Escherichia* such as, but not limited to *Escherichia coli; Francisella* such as, but not limited to, *Francisella tularensis; Haemophilus* such as, but not limited to, *Haemophilus influenzae; Helicobacter* such as, but not limited to, *Helicobacter pylori; Legionella* such as, but not limited to, *Legionella pneumophila; Leptospira* such as, but not limited to, *Leptospira interrogans, Leptospira santarosai, Leptospira wei-*

*lii*, and *Leptospira noguchii; Listeria* such as, but not limited to *Listeria monocytogenes; Mycobacterium* such as, but not limited to, *Mycobacterium leprae, Mycobacterium tuberculosis*, and *Mycobacterium ulcerans; Mycoplasma* such as, but not limited to, *Mycoplasma pneumoniae; Neisseria* such as, but not limited to, *Neisseria gonorrhoeae* and *Neisseria meningitidis; Pseudomonas* such as, but not limited to, *Pseudomonas aeruginosa; Rickettsia* such as, but not limited to, *Rickettsia rickettsii; Salmonella* such as, but not limited to, *Salmonella typhi* and *Salmonella typhimurium; Shigella* such as, but not limited to, *Shigella sonnei; Staphylococcus* such as, but not limited to, *Staphylococcus aureus, Staphylococcus epidermidis*, and *Staphylococcus saprophyticus; Streptococcus* such as, but not limited to, *Streptococcus agalactiae, Streptococcus pneumoniae*, and *Streptococcus pyogenes; Treponema* such as, but not limited to, *Treponema pallidum; Ureaplasma* such as, but not limited to, *Ureaplasma urealyticum; Vibrio* such as, but not limited to *Vibrio cholerae*; and *Yersinia* such as, but not limited to, *Yersinia pestis, Yersinia enterocolitica*, and *Yersinia pseudotuberculosis*.

Exemplary parasitic pathogens that can be assayed with the device include ectoparasites and endoparasites, including, without limitation, protozoa such as, but not limited to *Excavata* including *Giardia intestinalis, Hexamita salmonis, Histomonas meleagridis, Trichonympha, Trichomonadida, Trypanosoma cruzi, Trypanosoma brucei rhodensiense*, and *Trypanosoma brucei gambiense; Amoebozoa* including *Entamoeba histolytica, Naeglaria*, and *Acanthomoeba*; SAR including *Phytophthora infestans, Archaeplastida, Balantidium coli, Theileria parva, Theileria annulata, Phipicephalus appendiculatus, Spongospora subterranea, Mikrocytos mackini*, and *Prototheca moriformis*; and *helminths* including tapeworms such as, but not limited to *Echinococcus, Hymenolepis, Taenia* (e.g., *T. multiceps, T. serialis, T. glomerata*, and *T. brauni*); roundworms/nematodes such as, but not limited to *Necator americanus, Ancylostoma duodenale, Wuchereria bancrofti, Brugia malayi, Onchocerca volvulus, Ascaris lumbricoides, Trichuris, Trichostrongylus* spp., *Dracunculus medinensis*, and *Baylisascaris*; and flukes/trematodes such as, but not limited to, *amphistomes, Clonorchis sinensis, Fasciolopsis buski, Fascioloides magna, Fasciola hepatica, Opisthorchis, Paragonimus*, and *Schistosoma*.

Exemplary pathogenic fungi that can be assayed with the device include, without limitation, *Candida* such as, but not limited to, *Candida albicans; Aspergillus* such as, but not limited to, *Aspergillus fumigatus, Aspergillus flavus*, and *Aspergillus clavatus; Cryptococcus* such as, but not limited to, *Cryptococcus neoformans, Cryptococcus gattii, Cryptococcus laurentii*, and *Cryptococcus albidus; Histoplasma* such as, but not limited to, *Histoplasma capsulatum; Pneumocystis* such as, but not limited to, *Pneumocystis jirovecii; Stachybotrys* such as, but not limited to, *Stachybotrys chartarum; Blastomyces* sp.; *Coccidiode* such as, but not limited to, *Coccidiodes immitis* and *Coccidiodes posadasii; Fusarium* sp.; *Paecilomyces* sp.; *Paracoccidioides brasiliensis; Penicillium marneffei; Pseudallescheria boydii; Scedosporium* including, but not limited to, *Scedosporium apiospermum* and *Scedosporium prolificans; Rhizopus* sp.; *Mucor* sp.; *Absidia* sp.; *Cunninghamella* sp.; *Trichoderma longibrachiatium*; and *Trichosporon* sp.

In particular, the device can be used in combination with an LFA cartridge designed for detecting SARS-CoV-2 in a sample. In some embodiments, the LFA cartridge is designed for detecting SARS-CoV-2 antigens or antibodies (e.g., IgG and/or IgM) against SARS-CoV-2 in a sample. For example, the LFA cartridge may comprise a test strip with a specific binding reagent (e.g., an antibody) for an analyte (e.g., SARS-CoV-2 or a portion or component thereof, an anti-SARS-CoV-2 antibody (e.g., an IgG and/or an IgM specific for SARS-CoV-2) suspected of being in the sample.

The method may further include placing a positive control LFA cartridge, as described above, into the first LFA cartridge receiving portion of the device, as described above. The method may further include placing a smart reader into the frame of the device. The smart reader can be any smart reader such as a smart phone, digital camera, etc., as described above. The method may further include mating the base plate with the body, e.g., by way of mating structures and protrusions provided by the body and base plate, as described above. The method may further include capturing an image of the surface comprising the threshold intensity line, e.g., by way of a smartphone camera. The method may further include analyzing the image to determine detection of the threshold intensity line.

In some cases, the digital reader may comprise or be in communication with a computer readable medium. In some cases, the digital reader comprises or is in communication with a computer readable medium comprising instructions that cause a processor to detect the threshold intensity line and indicate successful detection of the threshold intensity line. In some cases, the digital reader comprises or is in communication with a computer readable medium comprising instructions that cause a processor to detect the optically detectable assay result from the LFA cartridge and indicate successful detection of the optically detectable assay result. In some cases, the computer readable medium includes an algorithm that converts the visual readout from the interaction of at least one analyte of interest with at least one ligand to a numerical value related to the presence or amount of the at least one analyte of interest present in the sample.

In certain embodiments, a detector of a digital reader, e.g., a smart phone camera or the like, will be used to capture the image of the surface comprising the assay region (and/or a control region) of the LFA cartridge and/or the threshold intensity line. The camera's CCD may take an image. In this image, both the threshold intensity line and assay region (e.g., the optically detectable assay result) may be present. The image of the threshold intensity line may be captured and analyzed before or after the image of the assay region is captured or analyzed. In some cases, the image of the threshold intensity line is captured and analyzed simultaneously with an image of the assay region. The digital image may then undergo digital signal processing with a selected digital processing algorithm to produce a representative image of the color bands for the threshold intensity line and assay region simultaneously. The digital processing algorithm may then take an integrative value based on a predetermined area within each of the bands, and add the intensity values of each of these pixels, producing a final intensity count. The intensity values of the count may be in the range of at least 0-128 for a 7-bit intensity depth grayscale image, or 0-255 for a 8-bit intensity depth grayscale image, or in any other ranges of intensity depth gray-scale images dependent on the camera imaging algorithm. The intensity values may also be in the range of 0-16384 for a two-color image with 7 bit color intensity depth, or in the range of 0-65536 for a two-color image with 8 bit color intensity depth, or in the range of 0-16777216 for a three-color image with 8 bit color intensity depth. The intensity values may also be in ranges that result from processing these values either in the camera imaging algorithm or in post-processing algorithms on the reader processor. The intensity count may be compared to a predetermined standard curve (or set of standard parameters) as obtained from LFA imaging from a variety of positive and negative samples to allow an either qualitative or quantitative assessment of the test result.

A single LFA cartridge may contain multiple types of different antibodies each conjugated with different dyes and multiple capture bands each immobilized with different antibodies. A single light source may illuminate all dyes simultaneously, and the detector device may capture the emitted signals from multiple bands simultaneously.

Capturing an image of a surface comprising an optically detectable marking includes illuminating the surface. Emission from various reporters (e.g., dyes) present in markings of an LFA cartridge can be excited by a number of light sources such as, e.g., an LED light source. Illumination by the light source may produce an optically detectable signal that includes at least one of emission (e.g., fluorescence), color, reflectance, diffuse scattering (i.e., scattering and absorbance), elastic light scattering, chemiluminescence, chemifluorescence, transmission, or absorbance from reporters. A lens (e.g., a collimating lens) and a detector (e.g., a CCD or CMOS camera) may be used to collect data from the reporters. A collimating lens and a CCD camera are used to collect the emitted light. The intensity of each of the markings and the concentration of each of the analytes can be quantified as described above.

The light source may include at least one of a camera flash, an autofocus illuminator on a camera, ambient light, sunlight, an LED light, an incandescent lamp, or a gas-discharge lamp. For example, the light source can come from micro-LED lamps that are included in the housing. The micro-LEDs can be selected to emit certain wavelengths that are adapted for one or more assay conditions. The micro-LEDs can be powered by drawing electrical power from the battery of digital camera device.

A wavelength filter may be interposed between the light source and the lateral-flow chromatographic immunoassay cartridge. For example, if the assay is a fluorescent assay, then the wavelength filter may be used to yield a specific wavelength of light from the light source to excite fluorescent emission from the assay system. Likewise, certain colored dyes may yield a better signal when excited by selected wavelengths of light.

The light source may include at least one focusing apparatus (e.g., a collimating lens) for focusing the light source on the lateral-flow chromatographic immunoassay cassette. For example, a focusing apparatus may be used to increase the amount of incident light on the analysis zone of the lateral-flow chromatographic immunoassay cassette. In another example, a focusing apparatus may be used to focus ambient light or sunlight on the analysis zone of the lateral-flow chromatographic immunoassay cassette in order to allow the digital camera device to capture at least one image of the assay output.

The digital reader may include or may be in communication with a computer readable medium comprising instructions that cause a processor to: analyze an image comprising the optically detectable assay result as captured by the digital reader; and indicate presence or absence of an analyte in a sample assayed by the LFA cartridge.

The computer readable medium may include instructions that cause the processor to compare a signal detected from the optically detectable assay result with the signal from the threshold intensity line to determine the validity of the optically detectable assay result. In some cases, the computer readable medium comprises instructions that cause the processor to execute an algorithm that provides an indication of an error when the threshold intensity line is not detected. When the threshold intensity line is not detected, the computer readable medium may include instructions that cause the processor to determine the image analysis of the optically detectable assay results are invalid and to discard the results. When the threshold intensity line is not detected, the computer readable medium may include instructions that cause the processor to adjust the focus of the detector, e.g., smartphone camera, and adjust the brightness of the light source, e.g., smartphone light. In some cases, when the threshold intensity line is not detected, the computer readable medium may include instructions that cause the processor to provide an indication to perform a corrective action to facilitate detection of the threshold intensity line such as, e.g., an indication to repeat the image capture, clean the reader camera, adjust the reader light, and/or adjust the focus of the detector.

The instructions may cause the processor to perform any of the following: (1) receive a user initiated request to convert the visual signal readout of an LFA cartridge to a numerical value, (2) in response to the request, identify at least one visual signal readout of the LFA cartridge, (3) capture at least one digital photographic image of the at least one visual signal readout of the LFA cartridge, (4) convert the at least digital photographic image to at least one numerical value proportional to at least one of an intensity, a density, or a number of pixels in the at least one digital photographic image of the at least one visual signal readout of the immunoassay apparatus, and (5) use the at least one numerical value to determine an amount or concentration of at least one analyte present in the sample. This numerical value can then be displayed on a screen located on the detector device and/or stored, interpreted, or sent to a database. In some cases, the instructions cause the processor to implement a method for interpreting the numerical value related to the presence or amount of the at least one analyte present in the sample.

When the threshold intensity line is detected, the method may further include: placing the first LFA cartridge the first LFA cartridge receiving portion of the device; capturing an image of the surface comprising the optically detectable assay result; and analyzing the image and indicating presence or absence of an analyte in a sample assayed by the LFA cartridge.

When the threshold intensity line is not detected, the method may further include: determining that the image analysis of the first LFA cartridge are invalid, discarding the results from the image analysis of the first LFA cartridge, and/or providing an indication of an error that the threshold intensity line is not detected and/or the assay results are invalid. In some cases, the method further includes adjusting the focus of the detector, e.g., smartphone camera, and adjusting the brightness of the light source, e.g., smartphone light. In some cases, the method further includes providing an indication to perform a corrective action to facilitate detection of the threshold intensity line such as, e.g., and indication to repeat the image capture, clean the reader camera, adjust the reader light, and/or adjust the focus of the detector. In some cases, the method may further include: capturing an image of the surface comprising the threshold intensity line; and analyzing the image to determine detection of the threshold intensity line.

When the threshold intensity line is detected, the method may further include: capturing an image of the surface of the first LFA cartridge comprising the optically detectable assay result, and analyzing the image and indicating presence or absence of an analyte in a sample assayed by the LFA cartridge. In some cases, the method may further include providing a "validity score" for the image analysis of the optically detectable assay result under the given circumstances (e.g., ambient light intensity, degree of dust/dirt contamination on optical surfaces, auto-focus precision of the camera, etc.)

A method for reading a result indicative of the presence or absence of an analyte in a sample may include: applying a sample to an LFA cartridge comprising an assay region and a positive control region, as described above, placing the LFA cartridge in a first LFA cartridge receiving portion or a second LFA cartridge receiving portion of the device, as described above, placing the digital reader into the frame of the device as described above, mating the body to the base plate of the device, capturing an image of a surface of the LFA cartridge comprising the assay region and the positive control region; capturing an image of the threshold intensity line; analyzing the image to determine detection of the threshold intensity line.

When the threshold intensity line is detected, the method may further include: analyzing the image and indicating presence or absence of an analyte in a sample assayed by the LFA cartridge.

When the threshold intensity line is not detected, the method may further include: determining that the image analysis of the first LFA cartridge are invalid, discarding the results from the image analysis of the first LFA cartridge, and/or providing an indication of an error that the threshold intensity line is not detected and/or that the assay results are invalid. In some cases, the method further includes adjusting the focus of the detector, e.g., smartphone camera, and adjusting the brightness of the light source, e.g., smartphone light. In some cases, the method further includes providing an indication to perform a corrective action to facilitate detection of the threshold intensity line such as, e.g., an indication to repeat the image capture, clean the reader camera, adjust the reader light, and/or adjust the focus of the detector. In some cases, the method may further include: capturing an image of the surface comprising the threshold intensity line; and analyzing the image to determine detection of the threshold intensity line.

When the threshold intensity line is detected, the method may further include analyzing the image and indicating presence or absence of an analyte in a sample assayed by the LFA cartridge.

EXAMPLES

As can be appreciated from the disclosure provided above, the present disclosure has a wide variety of applications. Accordingly, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Those of skill in the art will readily recognize a variety of noncritical parameters that could be changed or modified to yield essentially similar results. Thus, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Specific Embodiments

FIG. 1 provides a schematic of a device of the present disclosure. The device includes a body 101 for receiving a smartphone 100. A majority of the surfaces of the smartphone 100 are covered by the body 101 of the device, except for the touch screen which is framed by the body. The body further provides an opening for attaching a power cord to the smartphone 100 when the smart phone is held in the body. The body further provides an opening 107 for accessing the on/off switch of the smartphone at the side of the frame. FIG. 1 further depicts a base plate 104 having a first receiving portion 103 present at one end of the base plate and a second receiving portion 105 present at the opposite end of the base plate. A first LFA cartridge 102 may be inserted into the first receiving portion 103 in a first orientation relative to a planar surface of the smartphone and a second LFA cartridge 106 may be inserted into the second receiving portion in a second orientation relative to the same planar surface of the smartphone.

Figure 2A:
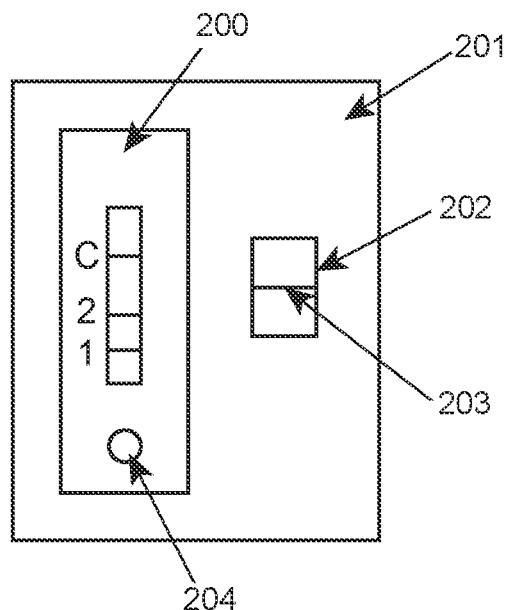
FIG. 2A depicts an overhead view of an embodiment of a lateral flow assay cartridge.

FIG. 2A shows a top view of an embodiment of a lateral flow assay cartridge having a base 201 with an assay region and a control region. The assay region and the control region are present in the same plane. The assay region includes a sample deposition area 204 coupled to a test region 200 having a test strip and reagents to perform a rapid diagnostic test assay. The test region includes a control line (C) to indicate that the test was performed properly. In the regions (1) and (2), lines of variable intensity may show up in dependence of targets found in the sample. For example, line (1) can show an intensity dependent on the concentration of Flu A antibodies in the sample, while line (2) shows an intensity dependent on the concentration of Flu B antibodies in the sample. A threshold-intensity line 203 disposed on a durable material plate 202 is shown. Since the control line (C) intensity can be rather low in the case of an early state of infection, assay result must be interpreted properly. By reading a comparably low-intensity line such as the threshold-intensity line present on the durable material plate at the same time (or shortly before the sample read, or at least once a day, or within another time interval) and comparing it to acceptance limits, it can be guaranteed that the optical pathway and the software algorithm for interpretation work properly to avoid interpretation errors.

Figure 2B:
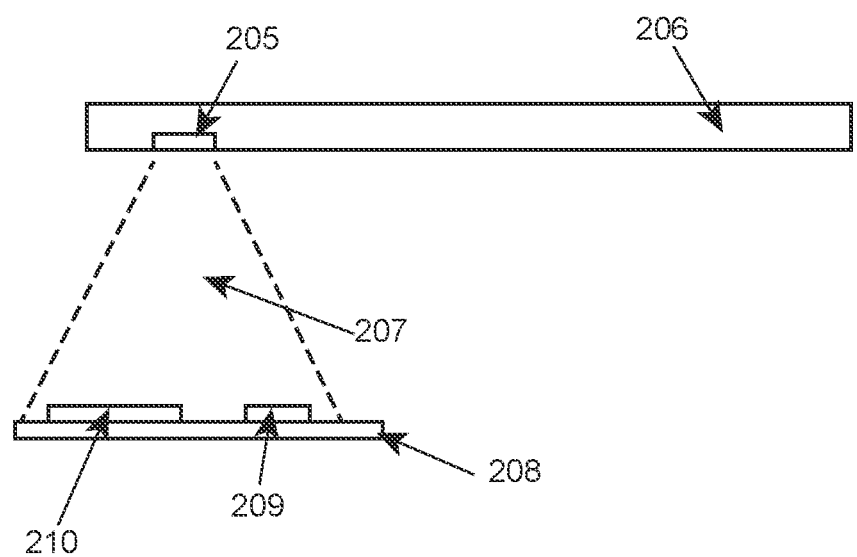
FIG. 2B depicts a side view of an embodiment of a lateral flow assay cartridge positioned relative to a digital reader.

FIG. 2B shows a side view of an embodiment of a lateral flow assay cartridge 208 positioned below a camera device 206 (e.g., a smartphone). The LFA cartridge is positioned such that a test region 210 of the LFA cartridge and threshold intensity line disposed on durable plate material 209 fall within the image field 207 of the camera lens 205 of the camera device 206.

Figure 3:
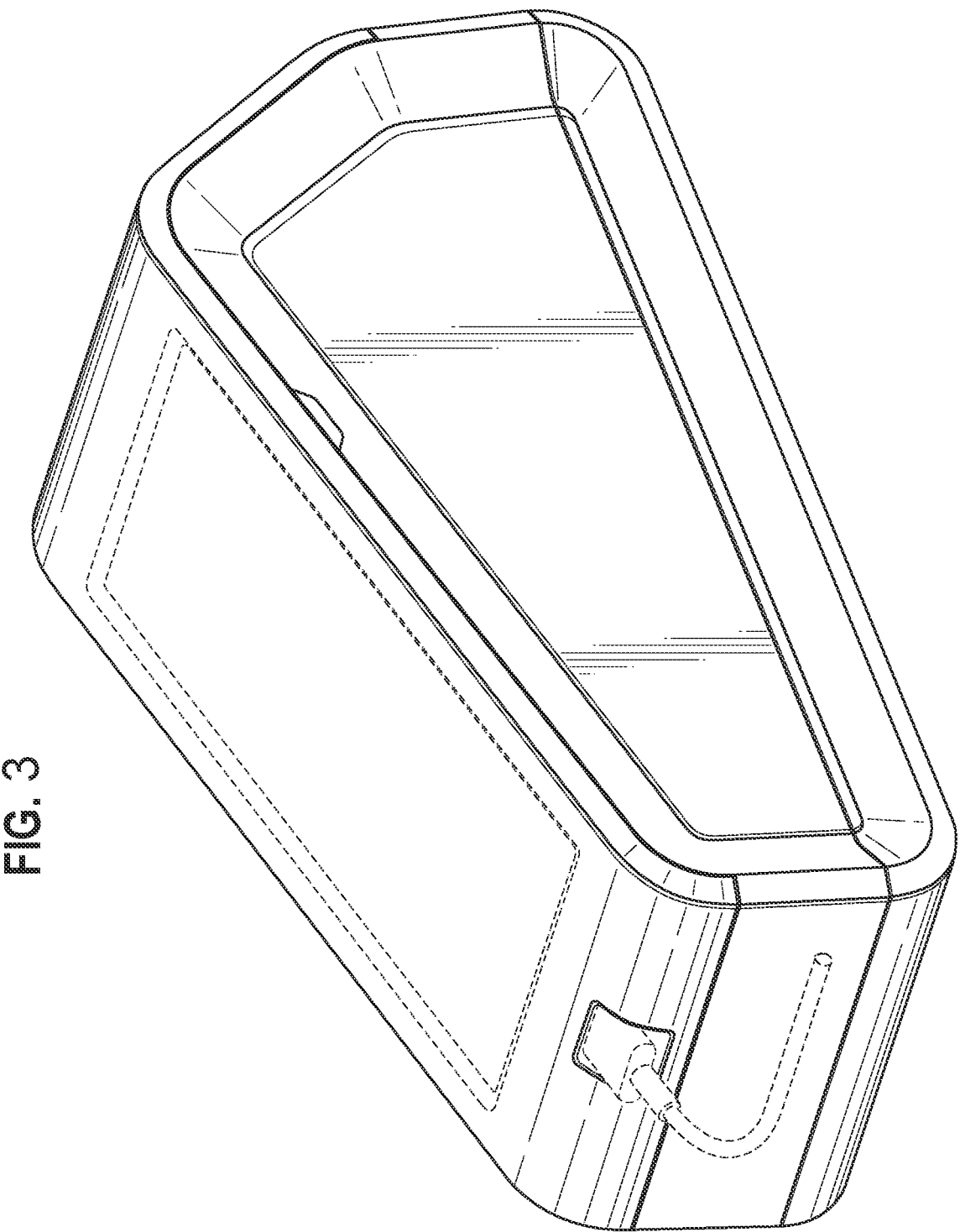
FIG. 3 depicts a perspective view of an embodiment of the subject device.

FIG. 3 depicts a perspective view of an embodiment of the device. A body for receiving a smart phone is attached to a base plate for receiving one or more LFA cartridges. The body includes a frame that extends around the sides of the smartphone but leaves the touch screen and charge port exposed.

Figure 4:
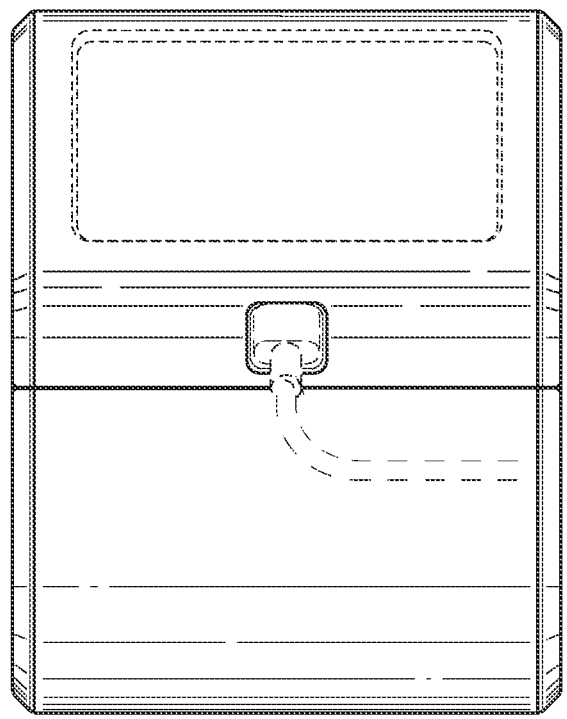
FIG. 4 depicts a view of a first end of an embodiment of the subject device.

FIG. 4 depicts a view of a first end of an embodiment of the subject device. A body for receiving a smart phone is attached to a base plate for receiving one or more LFA cartridges. The body includes a frame that extends around the sides of the smartphone but leaves the touch screen and charge port exposed.

Figure 5:
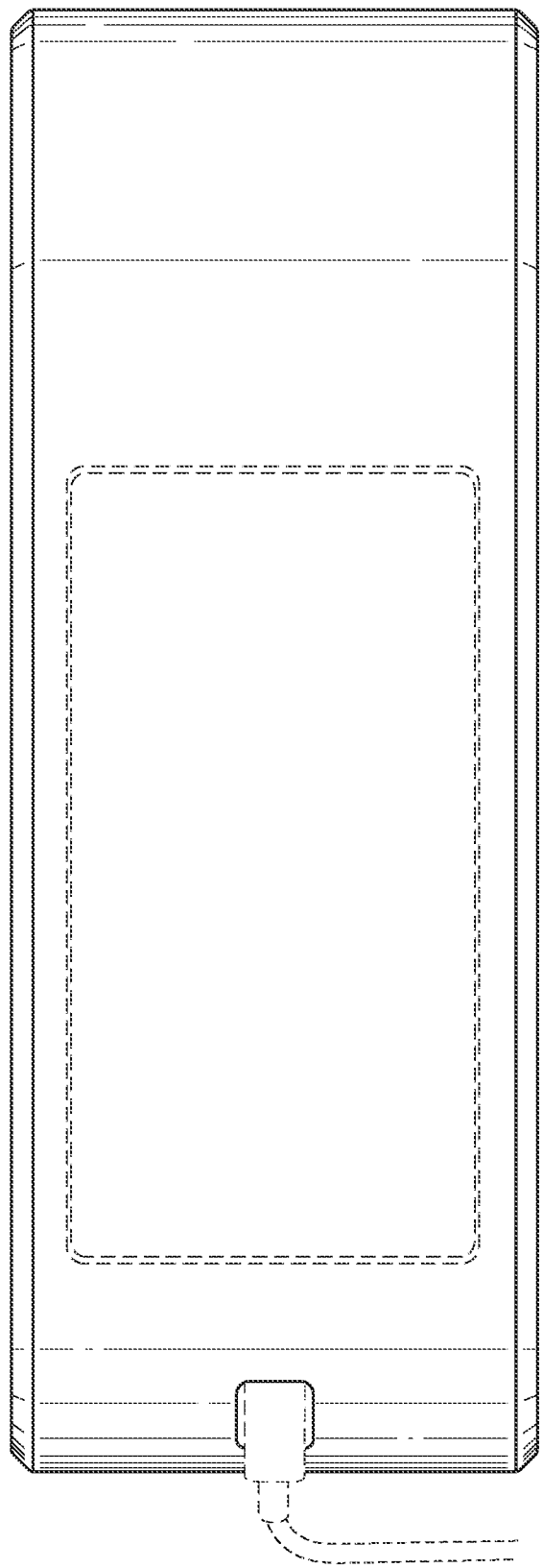
FIG. 5 depicts an overhead view of an embodiment of the subject device.

FIG. 5 depicts an overhead view of an embodiment of the subject device. A body includes a frame that extends around the sides of the smartphone but leaves the touch screen and charge port exposed.

Figure 6:
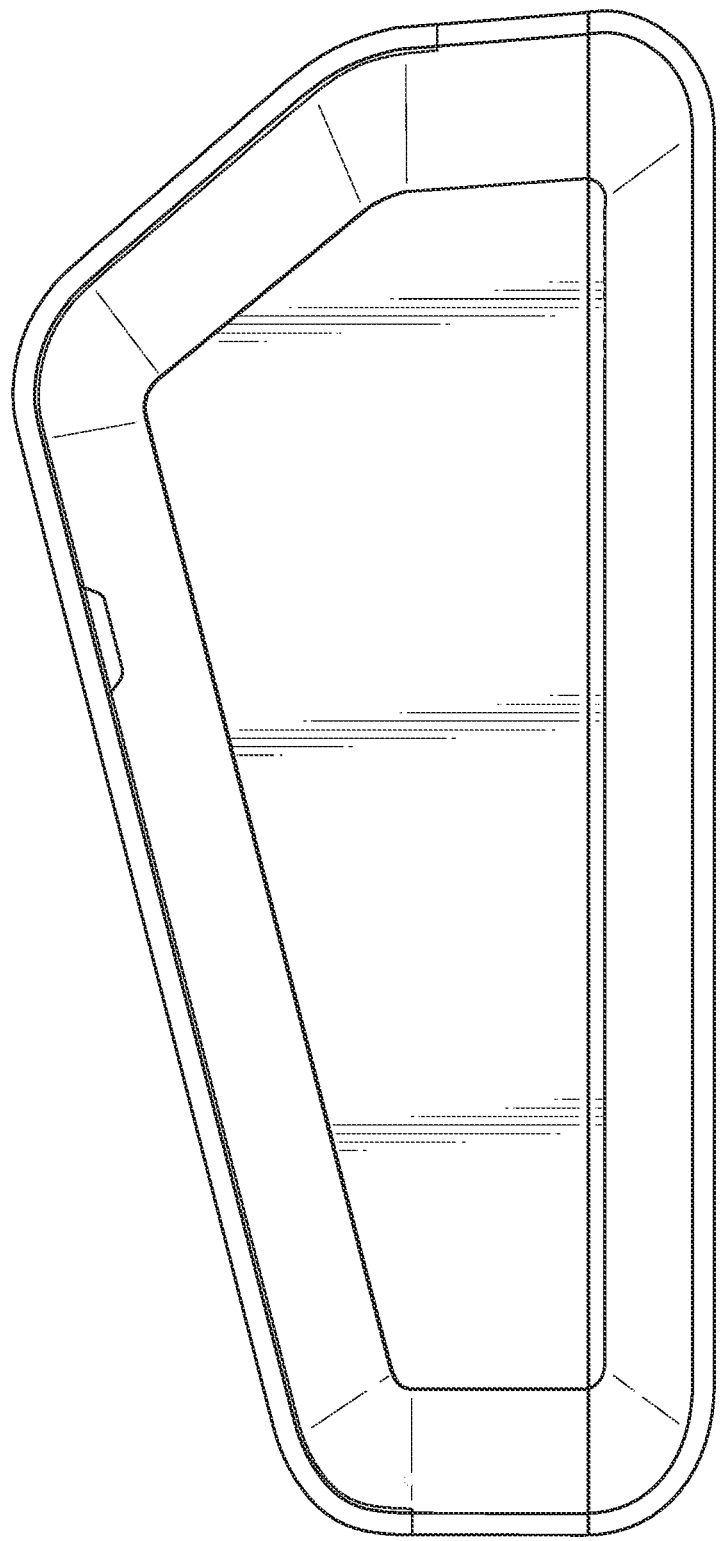
FIG. 6 depicts a side view of an embodiment of the subject device.

FIG. 6 depicts a side view of an embodiment of the subject device. A body for receiving a smart phone is attached to the base plate for receiving one or more LFA cartridges.

Figure 7:
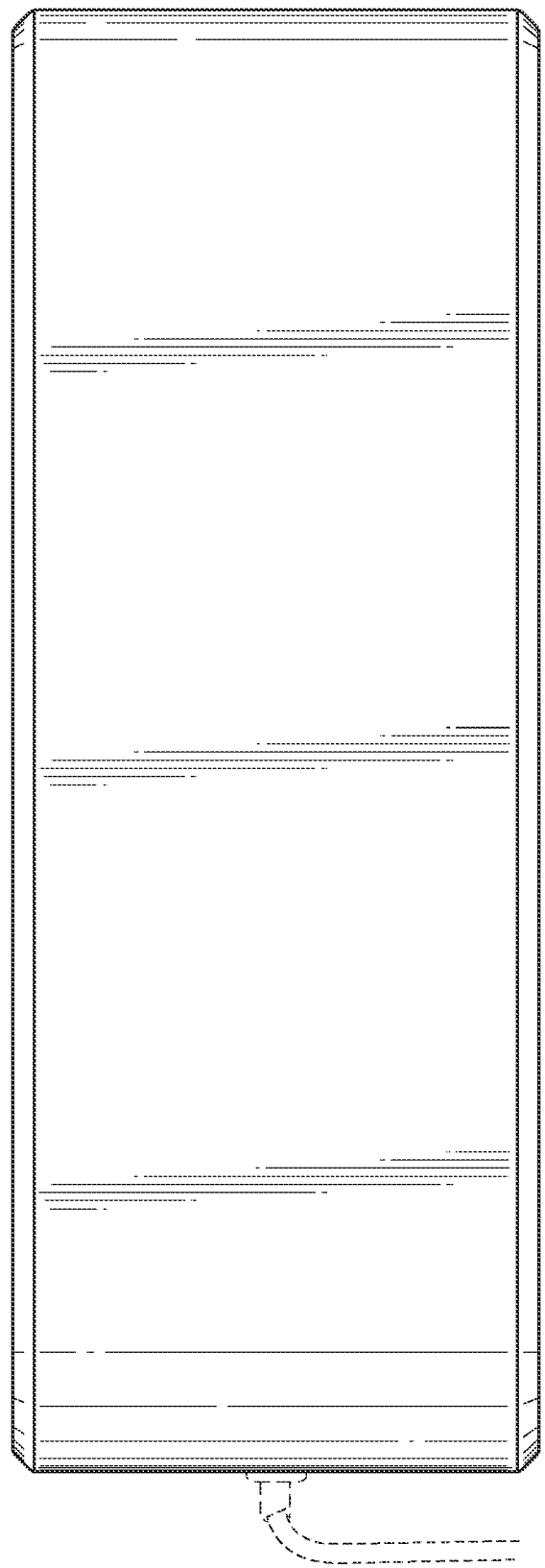
FIG. 7 depicts a bottom view of an embodiment of the subject device.

FIG. 7 depicts a bottom view of an embodiment of the base plate of the subject device.

Figure 8:
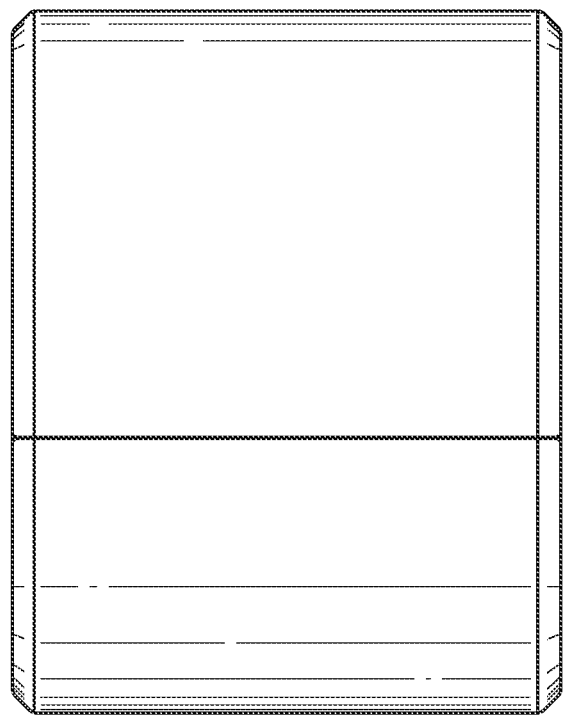
FIG. 8 depicts a view of a second end of an embodiment of the subject device.

FIG. 8 depicts a view of a second end of an embodiment of the subject device. A body for receiving a smart phone is attached to a base plate for receiving one or more LFA cartridges.

Figure 9A:
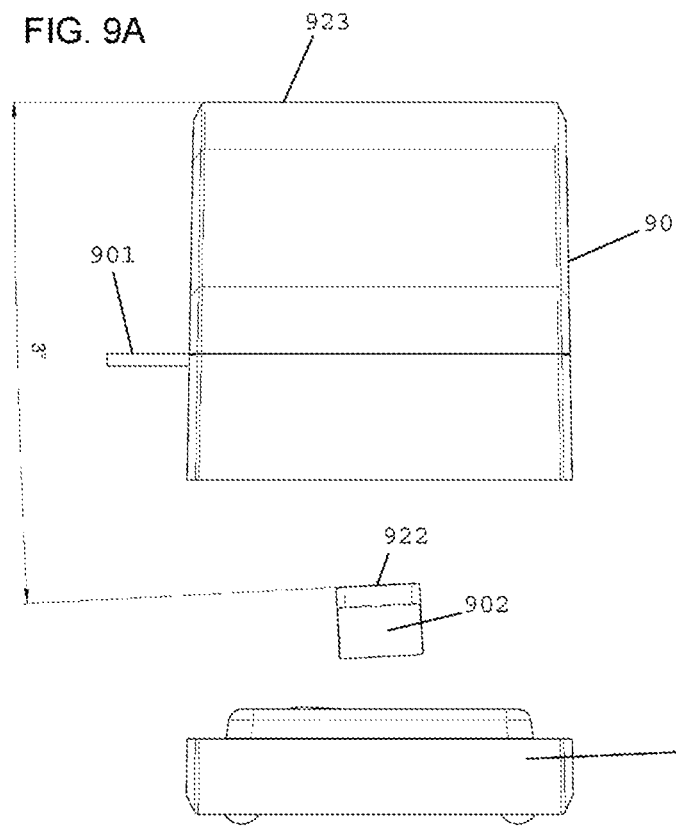
FIGS. 9A-9C depict an embodiment of a lateral flow assay cartridge positioned at an orientation relative to a surface of a digital reader.

FIG. 9A illustrates a view of an embodiment of a device of the present disclosure from the end facing the top latitudinal edge of a smartphone having a camera. A power cord 901 is coupled to the smartphone at the opposite end of the body. A base plate 903 for receiving an LFA cartridge 902 may be coupled to the body 900. The top latitudinal edge 922 of the LFA cartridge 902 is tilted at a horizontal angle of 3 degrees away from the planar surface 923 of the frame of the body 900 that houses the smartphone.

Figure 9B:
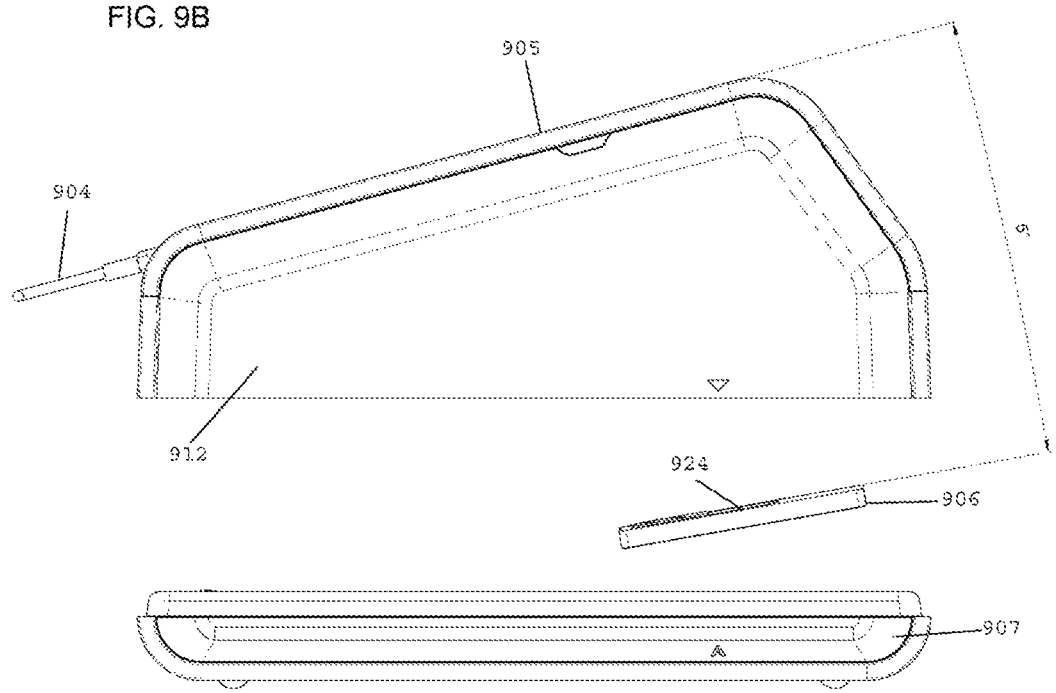

FIG. 9B illustrates a side view of an embodiment of a device of the present disclosure. The device includes a body 912 that may be coupled to a base plate 907 for receiving an LFA cartridge 906. The body 912 houses a smart phone that is coupled to power cord 904. The top longitudinal edge 924 of the LFA cartridge 906 is tilted at a vertical angle of 5 degrees towards the planar surface 905 of the frame of the body 912 that houses the smartphone.

Figure 9C:
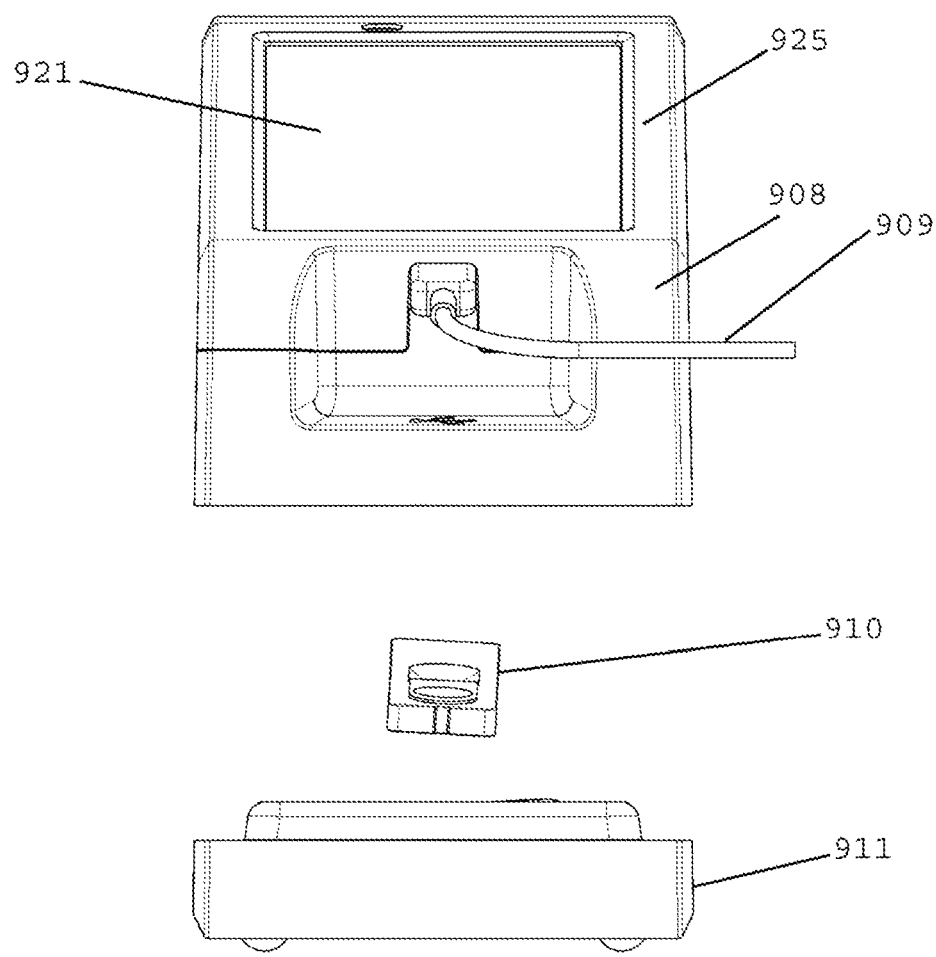

FIG. 9C illustrates a view of an embodiment of a device of the present disclosure from the end facing the bottom latitudinal edge of a smartphone having a charging port. The device includes a body 908 for housing the smartphone. The body includes a frame 925 that covers the surface of the smartphone but leaves the touch screen 921 exposed. A power cord 909 is coupled to the smartphone. The device further includes a base plate 910 that may be coupled to the body 908. The base plate 911 can receive an LFA cartridge.

Figure 10A:
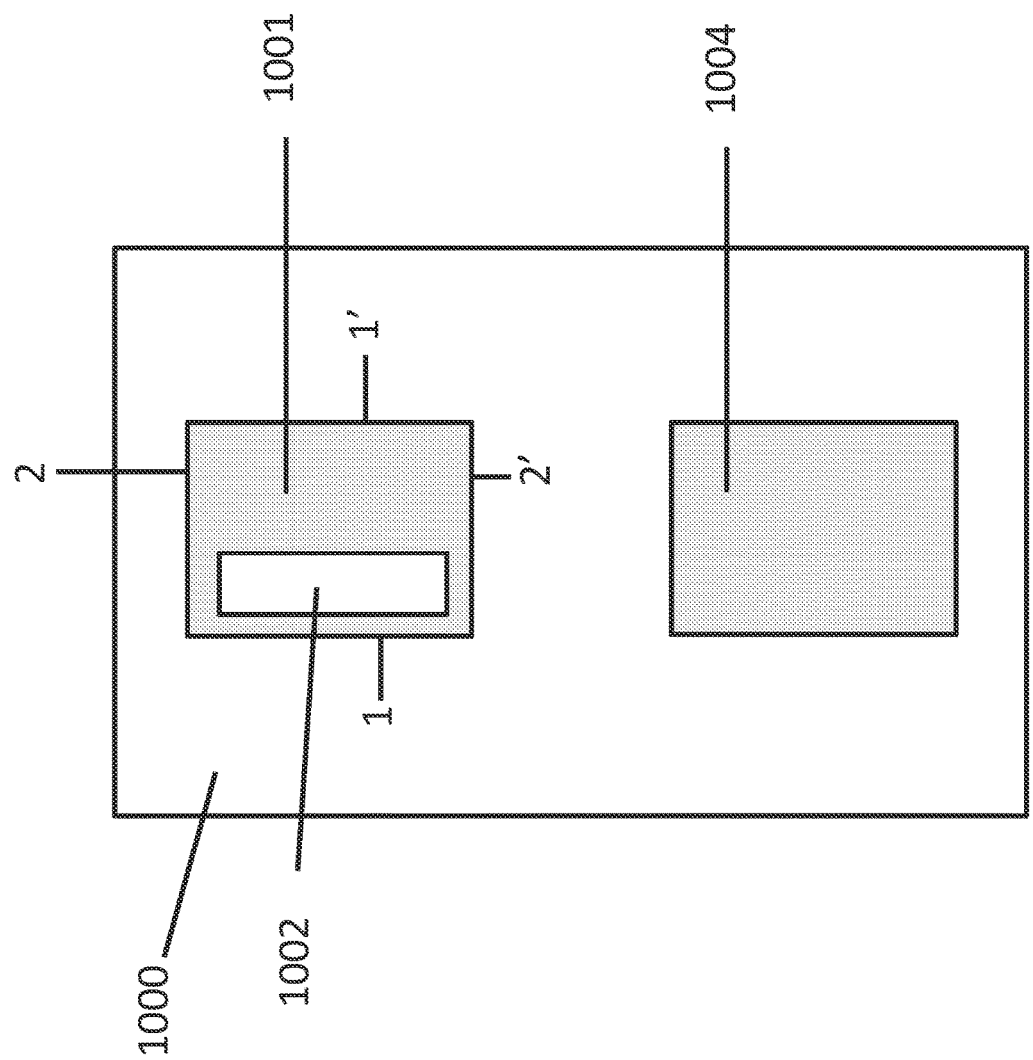
FIG. 10A depicts an overhead view of an embodiment of a base plate containing a lateral flow assay cartridge.
Figure 10B:
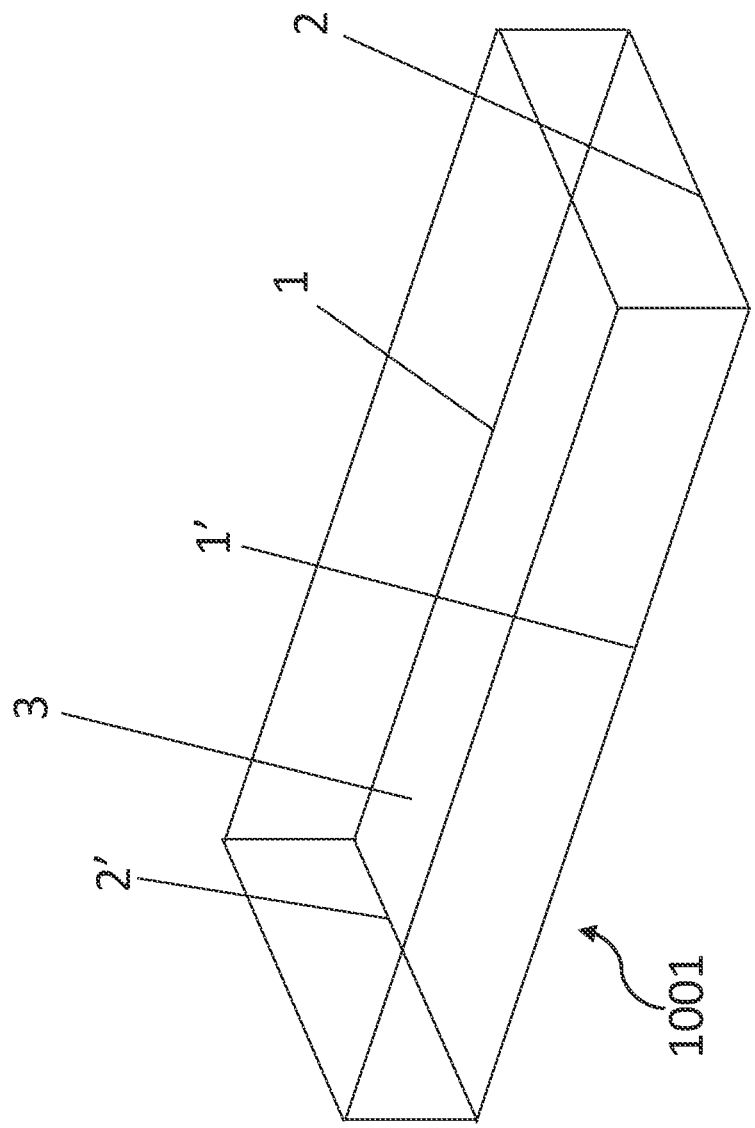
FIG. 10B depicts an embodiment of a receiving portion of a base plate.

FIG. 10A illustrates an overhead view of an embodiment of a base plate 1000 for receiving LFA cartridges. The base plate has a first receiving portion 1001 and a second receiving portion 1004 each for receiving at least one LFA cartridge. The first receiving portion 1001 is shown to hold one LFA cartridge 1002. The first receiving portion has a set of longitudinal edges 1 and 1' and a set of latitudinal edges 2 and 2'. FIG. 10B illustrates a perspective view of an embodiment of the first receiving portion 1001. The longitudinal edges and the latitudinal edges form a support surface 3 therebetween.

Figure 11:
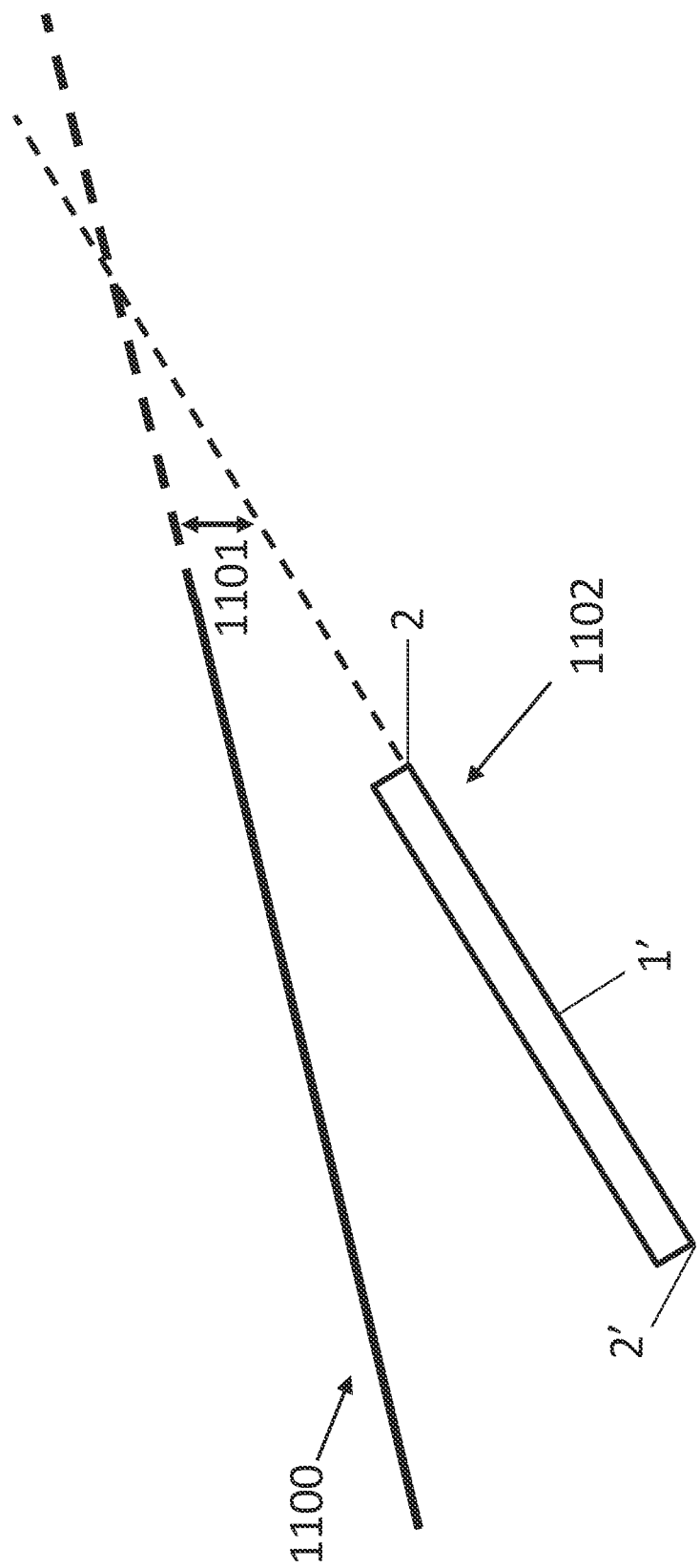
FIG. 11 depicts a vertical angle formed between a frame of the body of the subject device and a support surface of a receiving portion of a base plate.

FIG. 11 illustrates a vertical angle 1101 formed between a planar surface 1100 of a frame of a body for receiving a smart phone and a support surface 3 of the receiving portion 1102. A side view that faces the longitudinal edge 1' of the receiving portion 1102 is shown. The planar surface 1100 extends in the longitudinal direction and intersects the plane of the support surface at an angle 1101. The plane of the support surface between the longitudinal edges 1' and 1 is tilted towards the planar surface 1100 at the vertical angle 1101 such that the latitudinal edge 2 is positioned closer to the planar surface 1100 than the latitudinal edge 2'.

Figure 12:
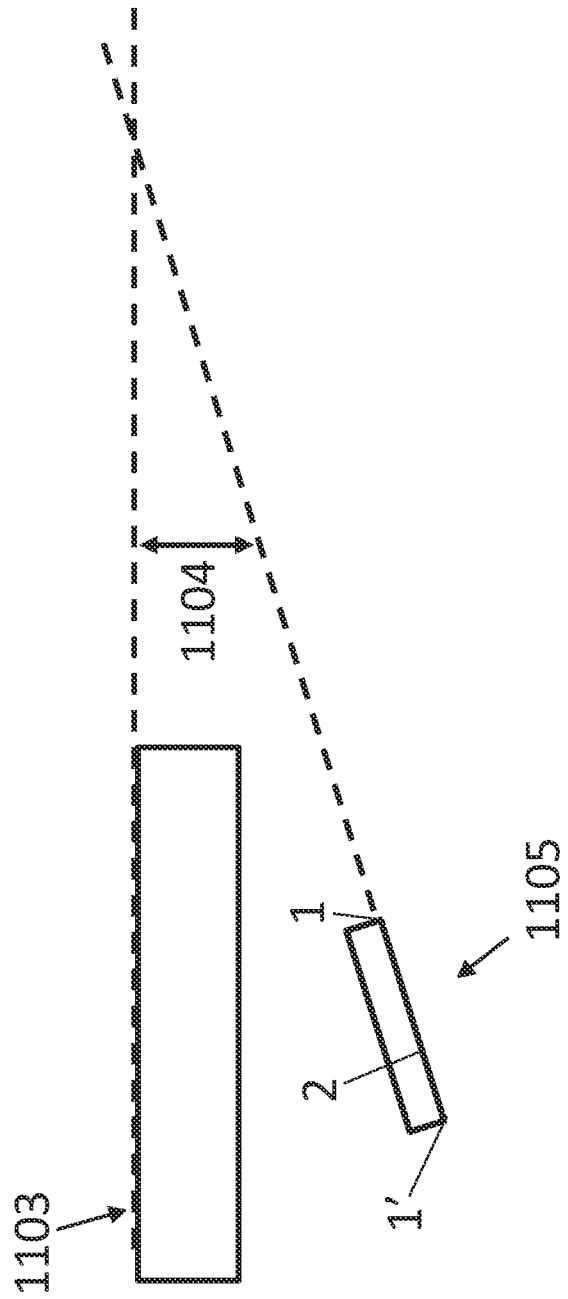
FIG. 12 depicts a horizontal angle formed between a frame of the body of the device and a support surface of a receiving portion of a base plate.

FIG. 12 illustrates an example of a horizontal angle 1104 formed between a planar surface 1103 of a frame of a body for receiving a smart phone and a receiving portion 1105 of a base plate. A front view that faces the latitudinal edge 2 of the receiving portion is shown. The planar surface 1103 extends in the latitudinal direction and intersects the plane of the support surface at an angle 1104. The plane o the support surface between the latitudinal edges 2 and 2' is titled away from the planar surface 1103 such that the longitudinal edge 1' is positioned farther from the planar surface 1103 than the longitudinal edge 1.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims. It is also to be understood that the terminology used herein is for the purpose of describing particular embodiments only, and is not intended to be limiting, since the scope of the present invention will be limited only by the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A device for receiving a digital reader and a lateral flow assay (LFA) cartridge, the device comprising a body and a base plate, the body comprising:

a wall enclosing a space, the wall comprising a top portion and a bottom portion;

a frame coupled to the top portion of the wall, the frame configured to receive the digital reader;

a mating structure defined by the bottom portion of the wall, wherein the mating structure is configured to removably couple to a base plate;

the base plate comprising a first surface and a second surface defining a space therebetween, the space comprising, a first LFA cartridge receiving portion, wherein the first LFA cartridge receiving portion comprises a substantially planar first support surface that receives and holds a LFA cartridge in a substantially fixed position, wherein the first support surface is at a first fixed orientation relative to a planar space defined by the frame, and wherein the mating structure and at least a portion of the base plate have a shape having a line of symmetry such that the mating structure and the base plate are couplable in at least two orientations by rotation of one of the mating structure and the base plate.

2. The device of claim 1, wherein the space further comprises a second LFA cartridge receiving portion comprising a substantially planar second support surface that receives and holds a LFA cartridge, wherein the second support surface is at a second fixed orientation relative to the planar space defined by the frame.

3. The device of claim 2, wherein the first and second fixed orientations are different.

4. The device of claim 2, wherein the first and second fixed orientations are the same.

5. The device of claim 1, wherein the first fixed orientation comprises a horizontal angle ranging from +1 degrees to +10 degrees or −1 degrees to −10 degrees, measured as a tilt of a first latitudinal edge away from the planar surface.

6. The device of claim 1, wherein the first fixed orientation comprises a vertical angle ranging from −15 degrees to −1 degrees or +1 degrees to +15 degrees, measured as a tilt of a first longitudinal edge towards the planar surface.

7. The device of claim 2, wherein the second fixed orientation comprises a horizontal angle ranging from +1 degrees to +10 degrees, or −10 degrees to −1 degrees, measured as a tilt of a second latitudinal edge away from the planar surface.

8. The device of claim 2, wherein the second fixed angle is a vertical angle ranging from −15 degrees to −1 degrees or +1 degrees to +15 degrees, measured as a tilt of a second longitudinal edge towards the planar surface.

9. The device of claim 1, wherein the first surface comprises a protrusion that snaps into the mating structure.

10. The device of claim 1, wherein the device is manufactured from an opaque material.

11. The device of claim 1, wherein the device is manufactured from a light absorbing material.

12. The device of claim 1, wherein the first surface of the base plate faces an interior of the device and comprises a light absorbing material or wherein the second surface of the base plate faces an interior of the device and comprises a light absorbing material.

13. The device of claim 1, wherein the mating structure and at least a portion of the base plate have a rectangular shape.

14. The device of claim 1, wherein the mating structure and at least a portion of the base plate have a square shape.

15. The device of claim 2, further comprising a threshold intensity line present on the first surface of the base plate and adjacent to the first LFA cartridge receiving portion or the second LFA cartridge receiving portion.

16. The device of claim 15, wherein the threshold intensity line is disposed directly on the first surface.

17. The device of claim 15, wherein the threshold intensity line is disposed on a substantially flat solid support attached to the first surface.

18. The device of claim 17, wherein the threshold intensity line has a reflection intensity that is at least 0.1-10% lower than the surface reflection intensity of the solid support.

19. The device of claim 17, wherein the solid support comprises a ceramic sheet.

* * * * *